(12) United States Patent
Lee et al.

(10) Patent No.: US 11,736,919 B2
(45) Date of Patent: Aug. 22, 2023

(54) METHOD FOR RECEIVING AUDIO DATA BY USING BLUETOOTH TECHNOLOGY, AND DEVICE THEREFOR

(71) Applicant: LG ELECTRONICS INC., Seoul (KR)

(72) Inventors: Hyeonjae Lee, Seoul (KR); Jinkwon Lim, Seoul (KR); Taeyoung Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 143 days.

(21) Appl. No.: 17/436,373

(22) PCT Filed: Mar. 9, 2020

(86) PCT No.: PCT/KR2020/003270
§ 371 (c)(1),
(2) Date: Sep. 3, 2021

(87) PCT Pub. No.: WO2020/180168
PCT Pub. Date: Sep. 10, 2020

(65) Prior Publication Data
US 2022/0159436 A1     May 19, 2022

(30) Foreign Application Priority Data
Mar. 7, 2019  (KR) .......................... 10-2019-0026512

(51) Int. Cl.
*H04W 4/80*   (2018.01)
*H04B 5/00*   (2006.01)

(52) U.S. Cl.
CPC ............ *H04W 4/80* (2018.02); *H04B 5/0056* (2013.01)

(58) Field of Classification Search
CPC ............................. H04W 4/80; H04B 5/0056
See application file for complete search history.

(56) References Cited

U.S. PATENT DOCUMENTS

2014/0348327 A1   11/2014   Linde et al.
2015/0312858 A1*  10/2015   Kerai ............... H04W 52/0212
                                                              370/311

(Continued)

FOREIGN PATENT DOCUMENTS

| KR | 10-1543193 | 8/2015 |
|---|---|---|
| KR | 10-2017-0016883 | 2/2017 |
| WO | 2013003753 | 1/2013 |

*Primary Examiner* — David Bilodeau
(74) *Attorney, Agent, or Firm* — Bryan Cave Leighton Paisner LLP

(57) ABSTRACT

A method for receiving audio data using Bluetooth Low Energy technology, the method performed by a client device comprising: receiving, from a server device, a first advertisement message including information for providing an audio streaming service; receiving, from the server device, a second advertisement message including synchronization information for synchronization between the client device and the server device; receiving, from the server device, a third advertisement message including an indicator representing that audio data of the audio streaming service is grouped with audio data information for the audio data and transmitted; receiving, from the server device, broadcast audio data including the grouped audio data and the audio data information based on the indicator, through an isochronous channel; obtaining, from an user, specific information related to whether to permit a provision of the audio streaming service based on the audio data information; and decoding the audio data based on the specific information representing permission to provide the audio data.

15 Claims, 29 Drawing Sheets

(56) References Cited

U.S. PATENT DOCUMENTS

2016/0359925 A1*  12/2016  Song ................... H04L 65/1069
2017/0171798 A1*   6/2017  Song .................... H04W 60/00
2017/0251469 A1*   8/2017  Lee ................... H04W 72/0446
2017/0295284 A1*  10/2017  Song ................... H04L 65/1069
2021/0400096 A1*  12/2021  Lee ....................... H04W 76/10

* cited by examiner

[FIG. 1]
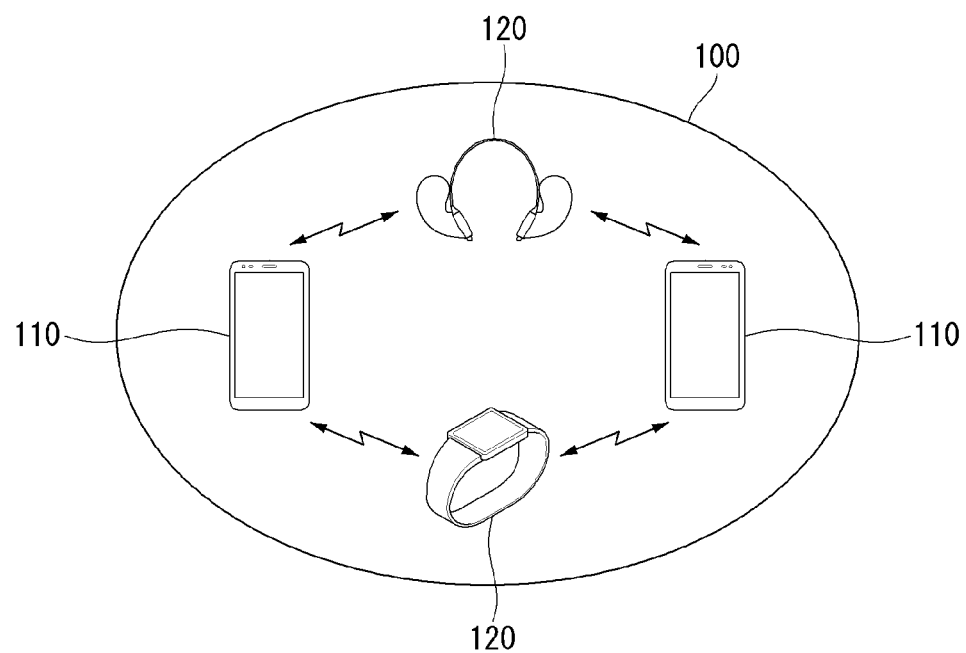

[FIG. 2]
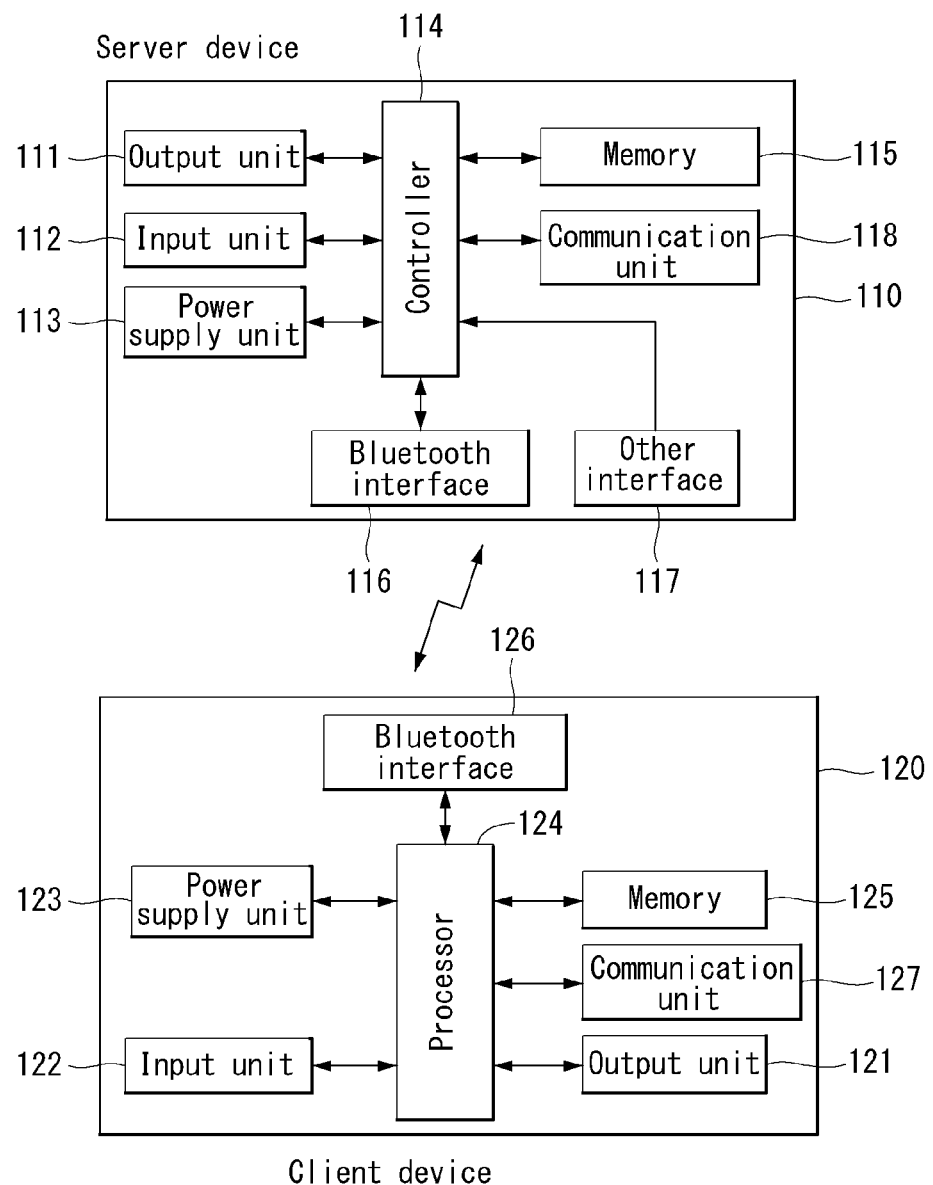

[FIG. 3]
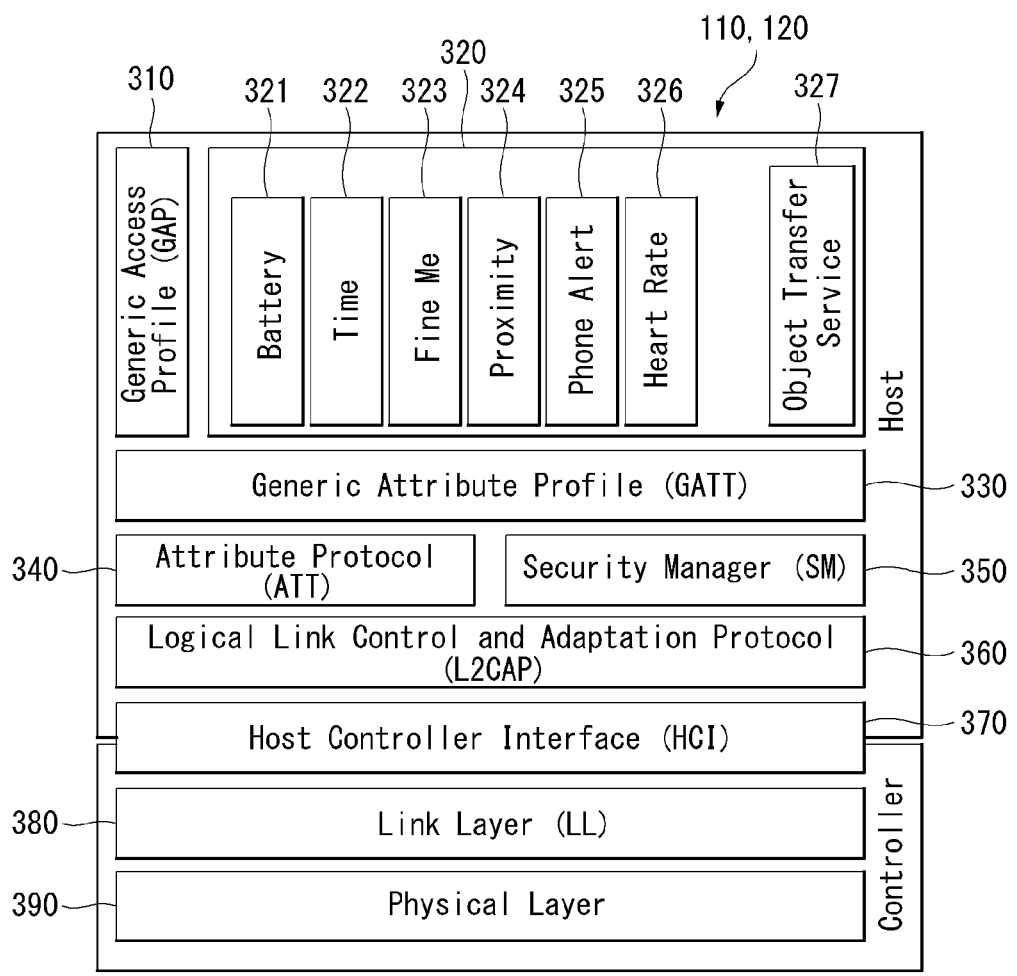

[FIG. 4]
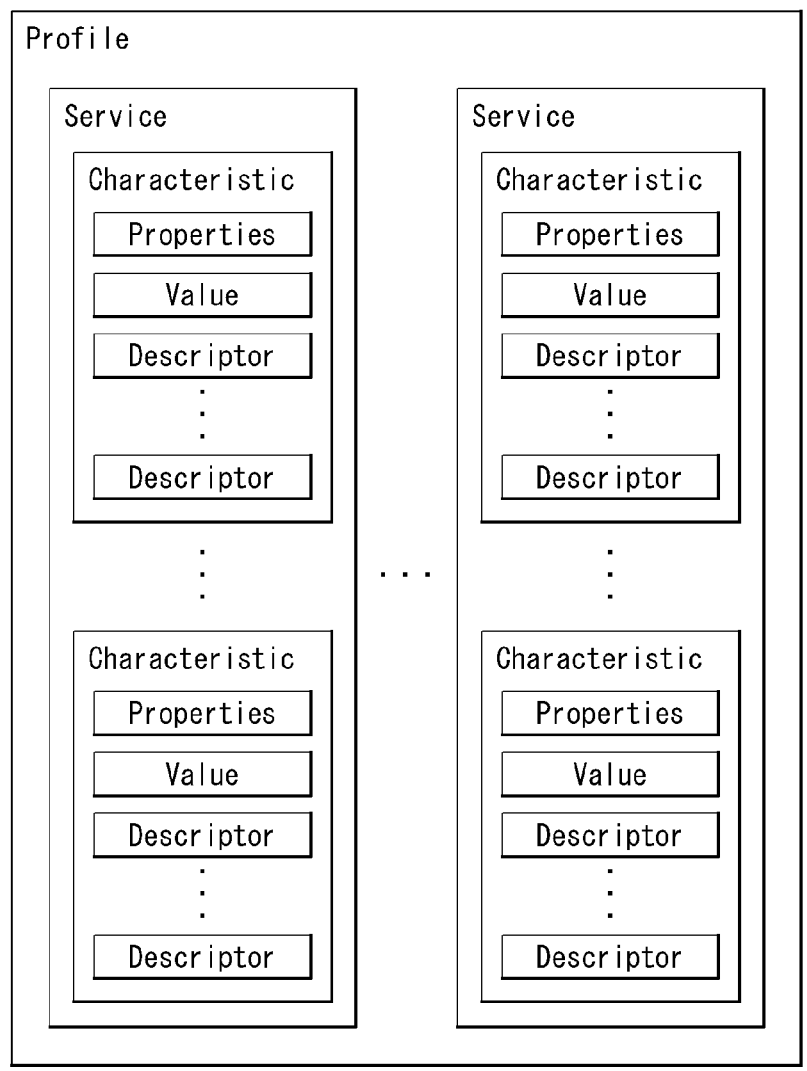

[FIG. 5]
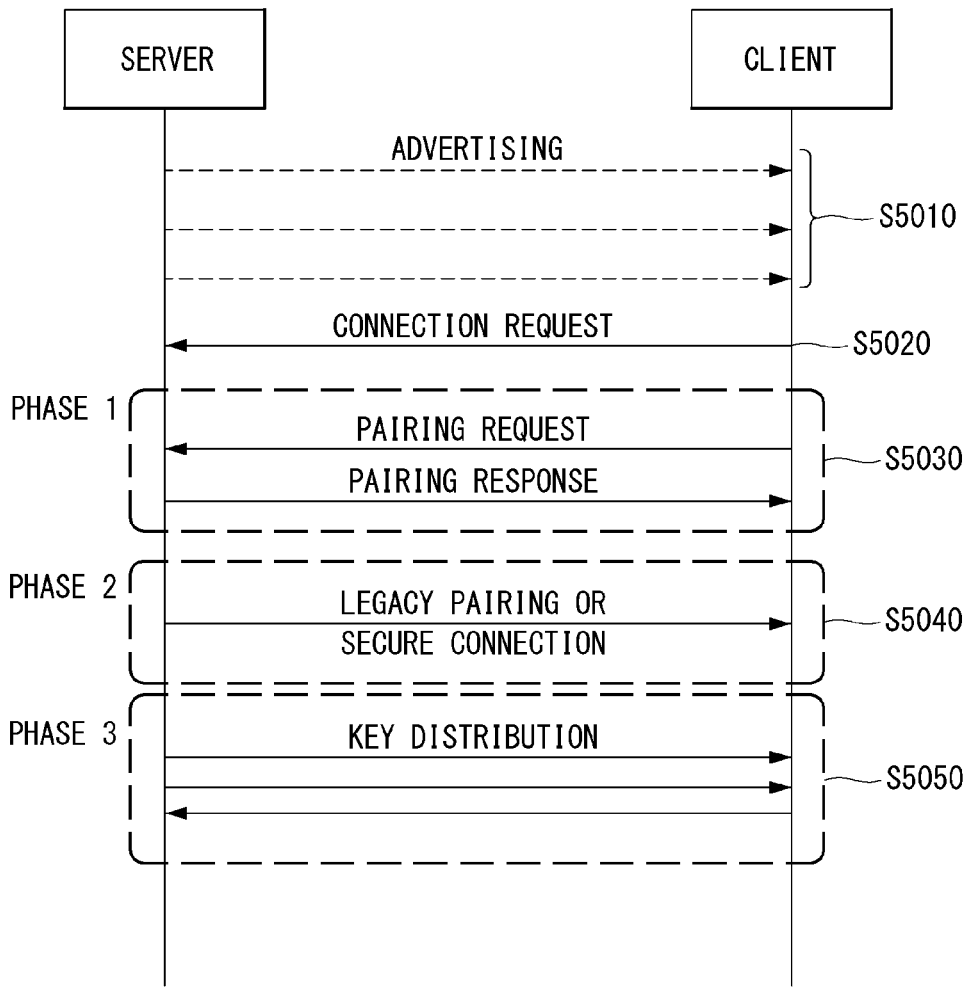
[FIG. 6]
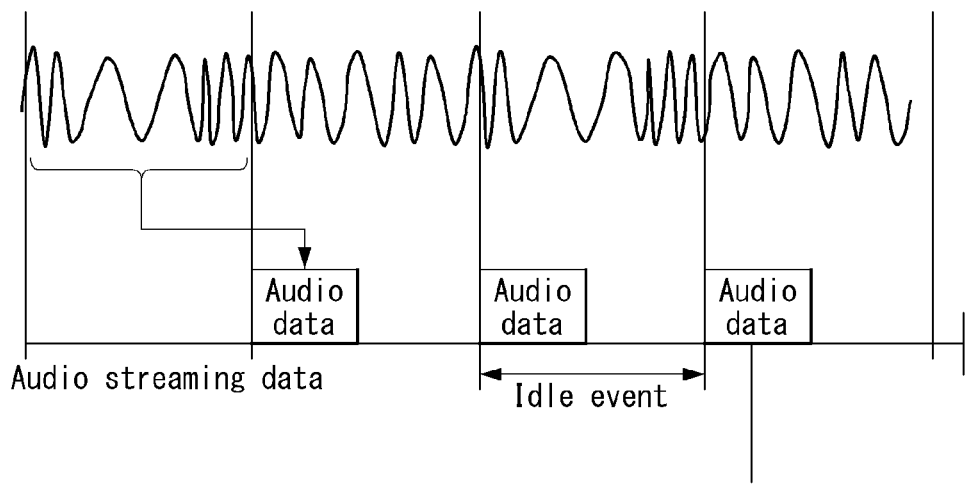

[FIG. 7]
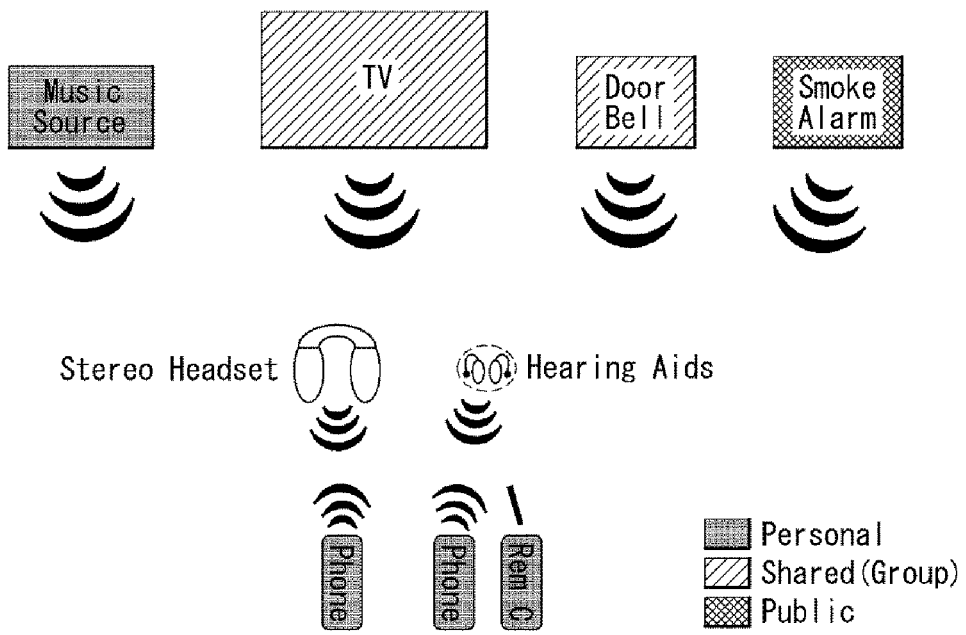
[FIG. 8]
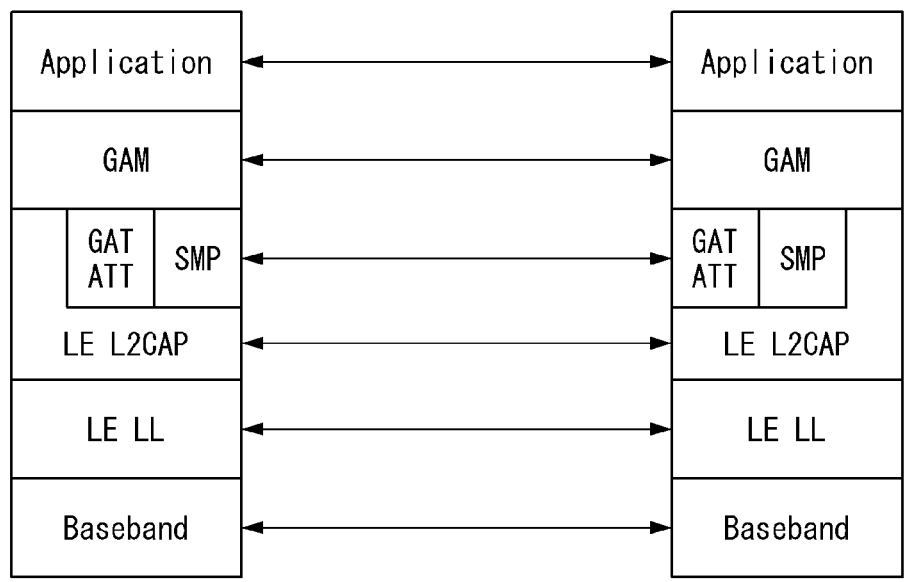

[FIG. 9]
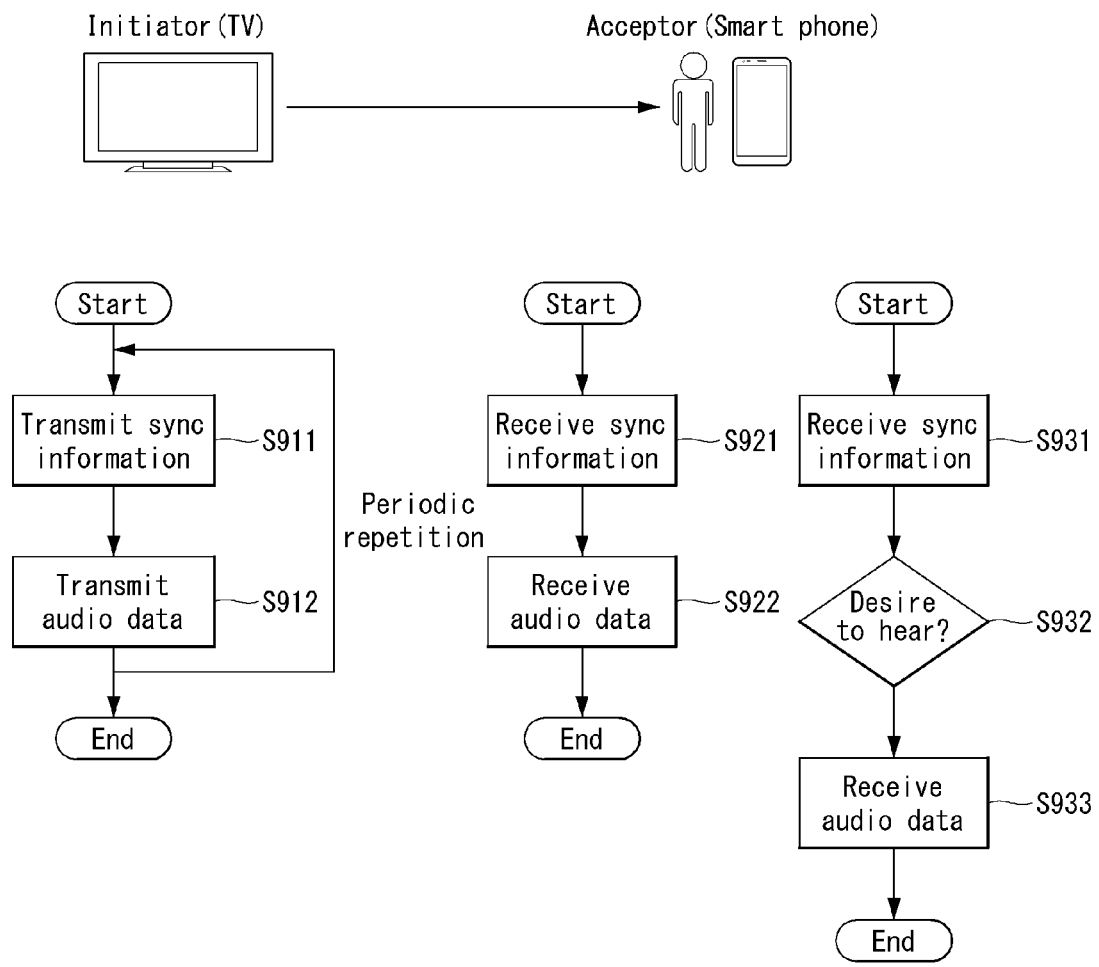

[FIG. 10]
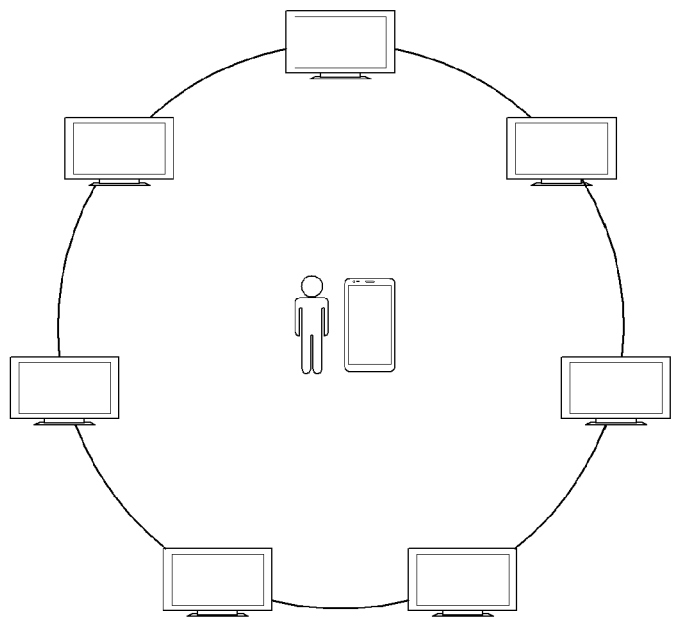

[FIG. 11]
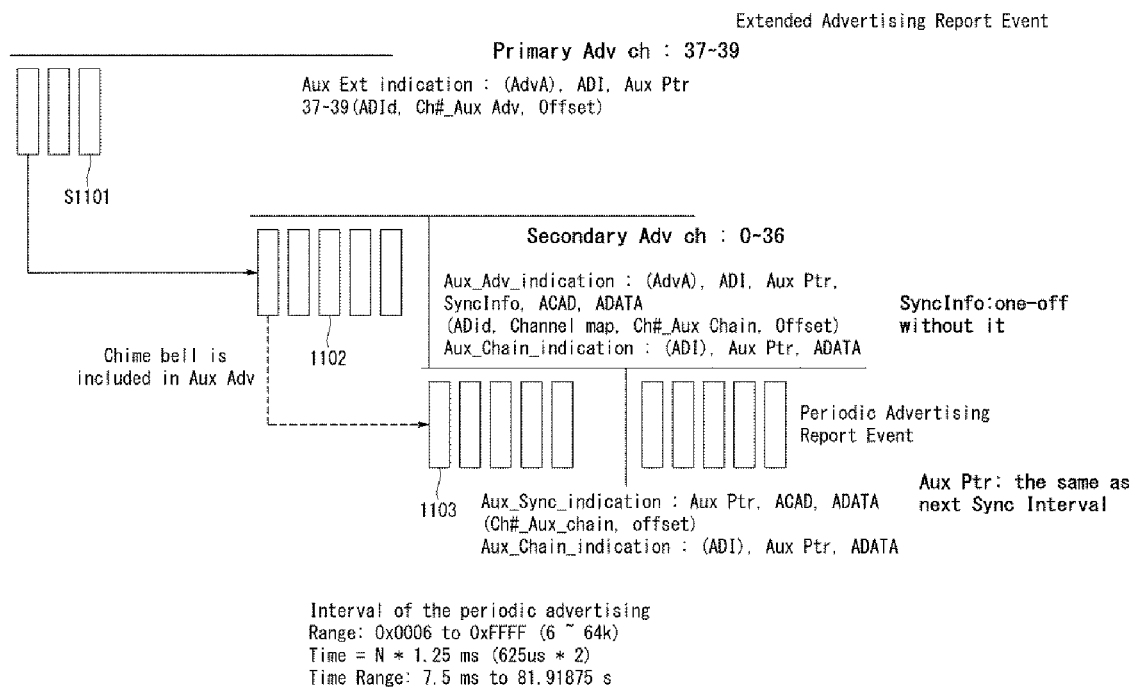
[FIG. 12A]
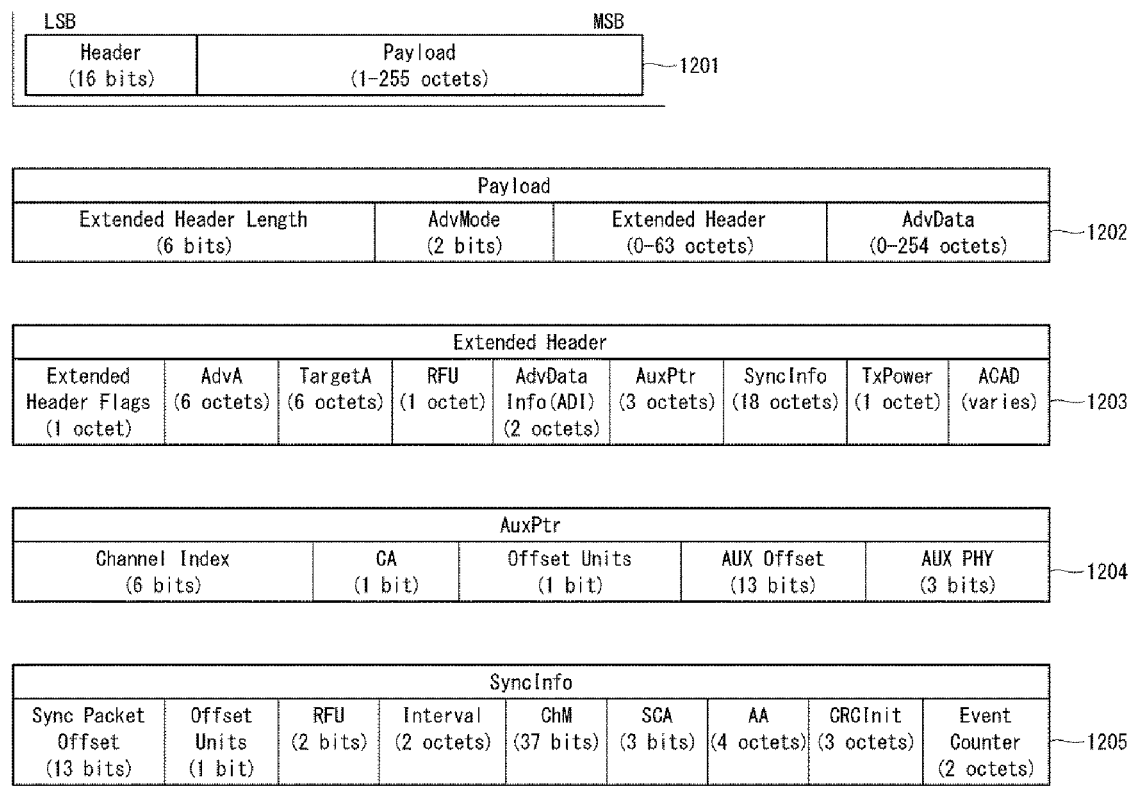

[FIG. 12B]
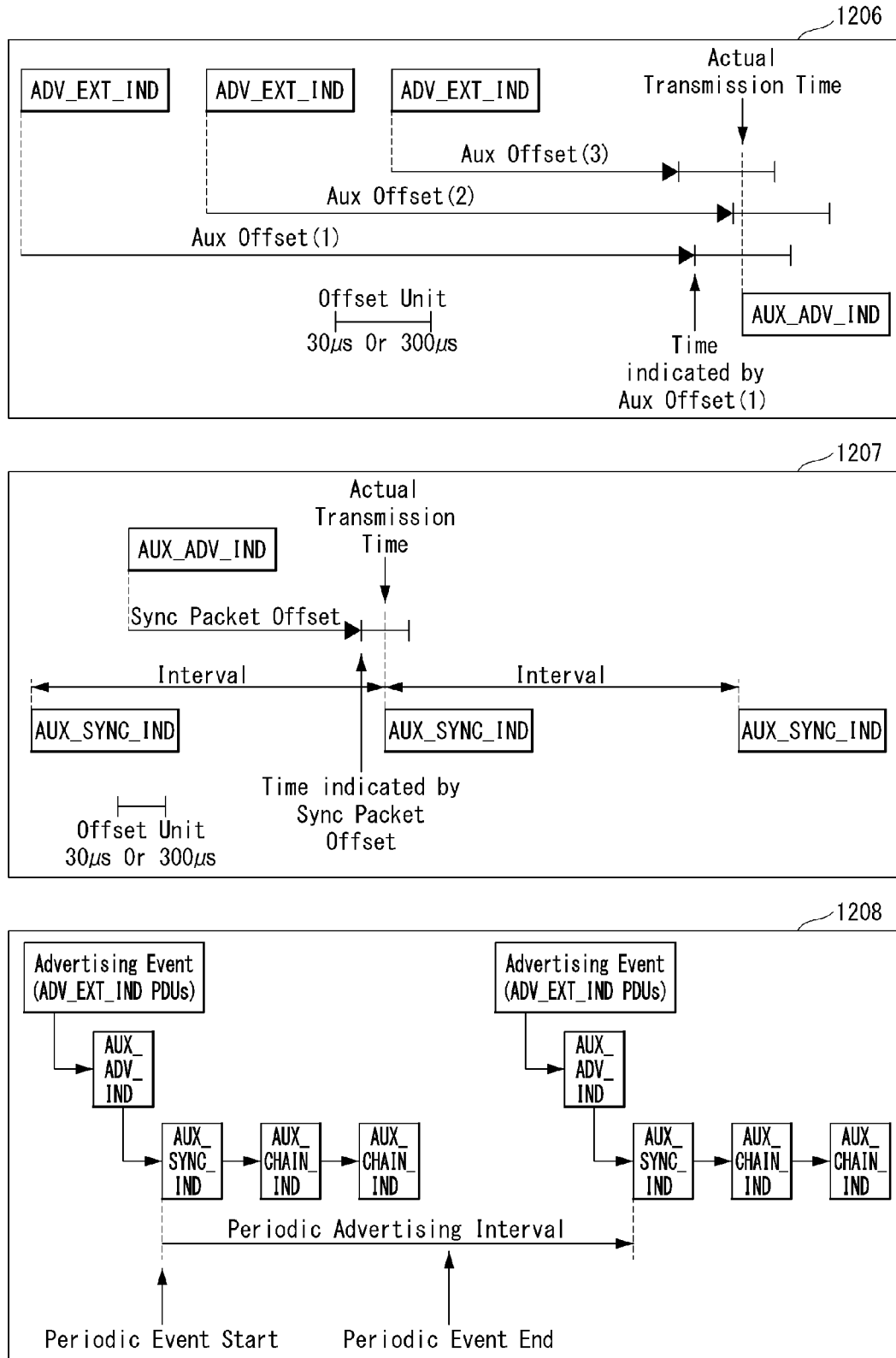

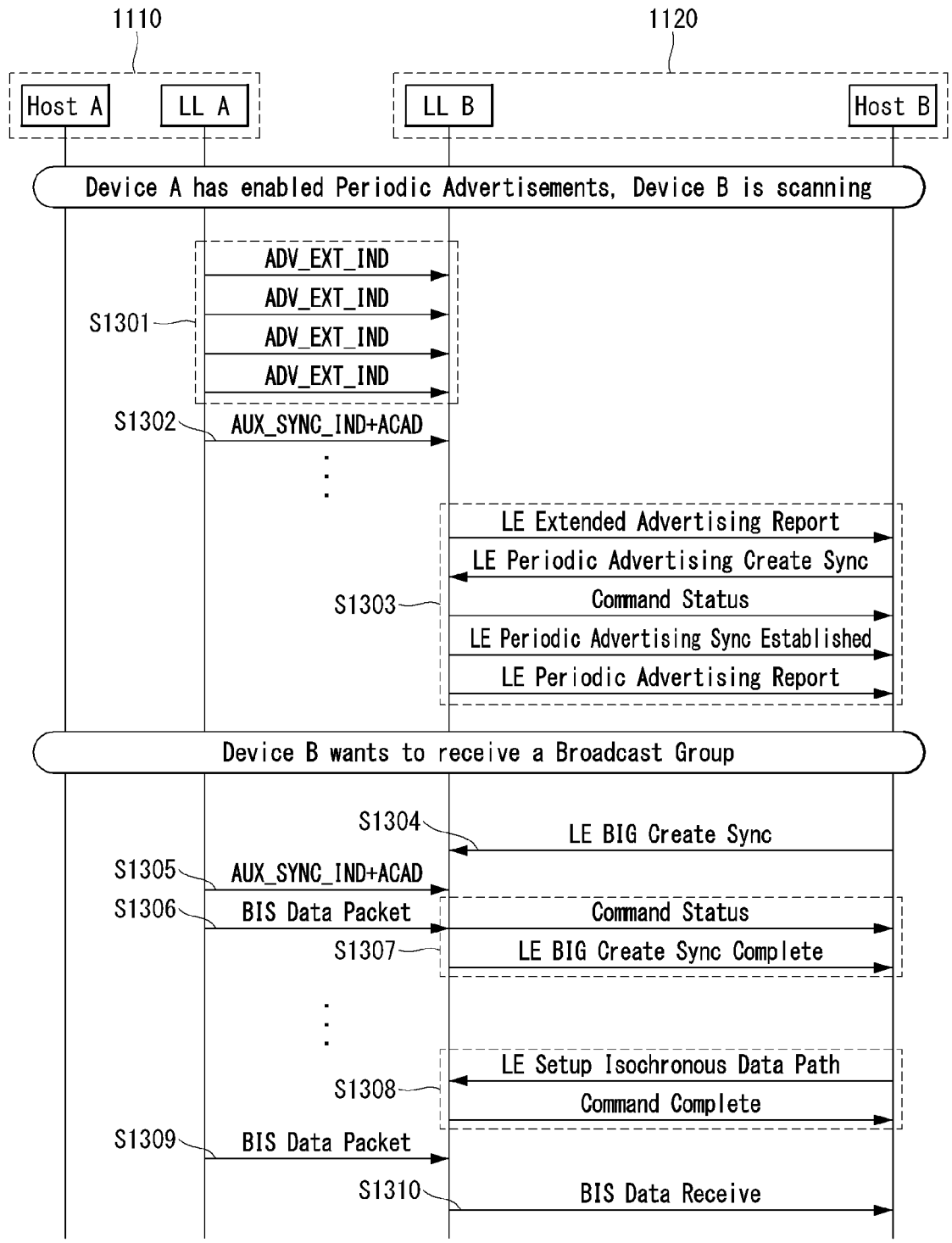
[FIG. 13]

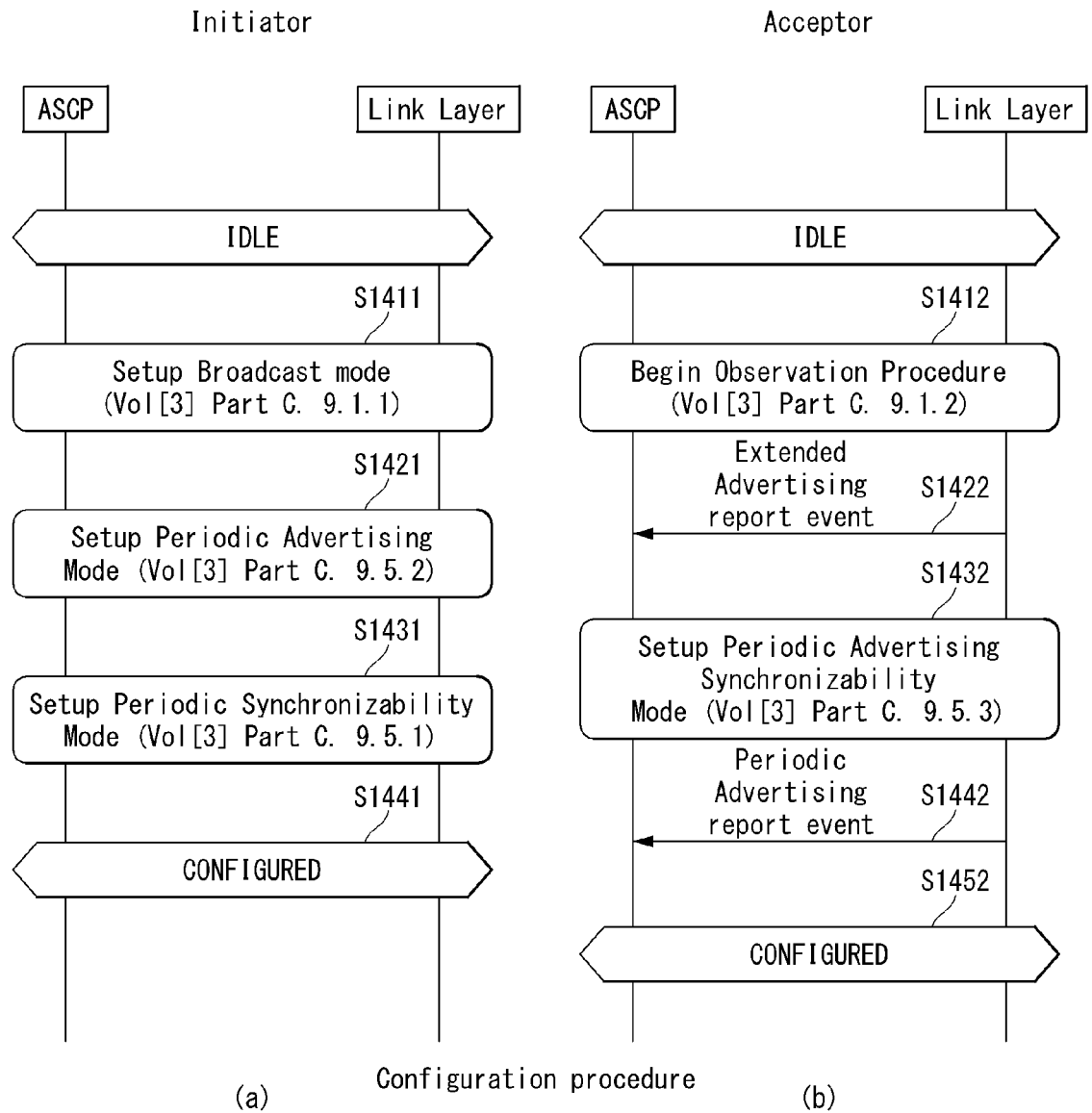
[FIG. 14]
Configuration procedure

[FIG. 15]
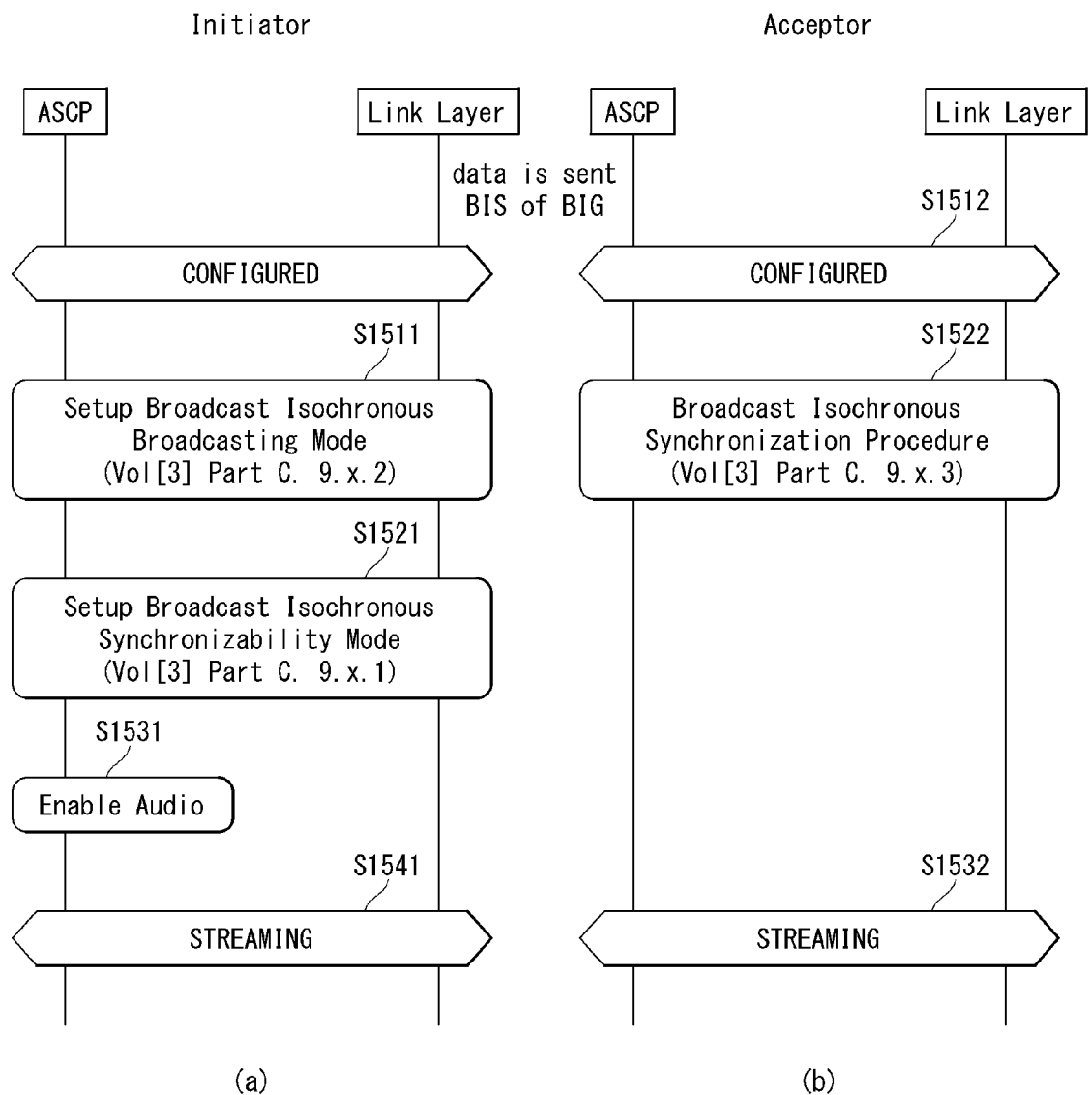

[FIG. 16]

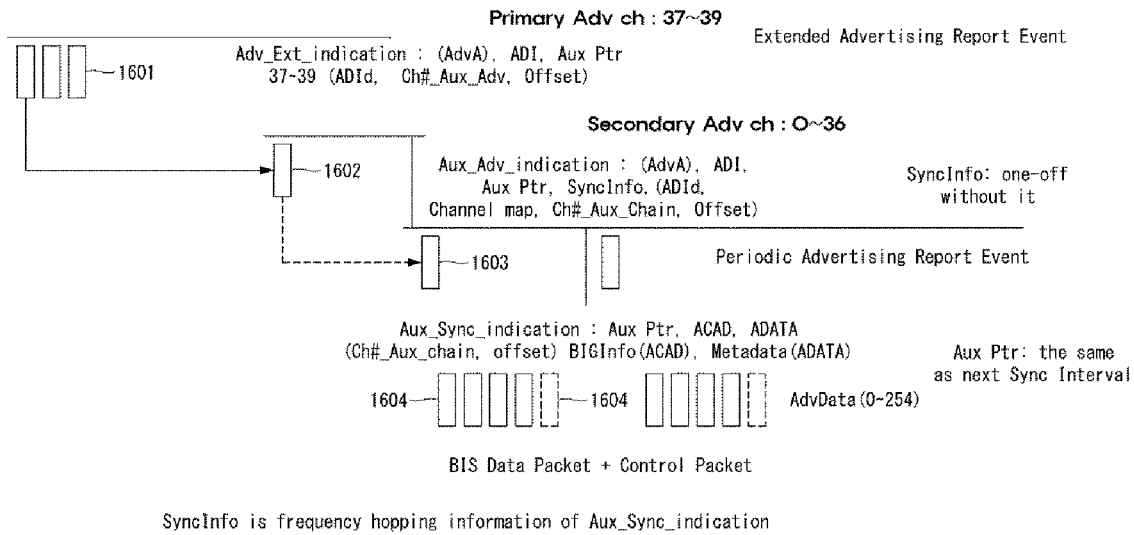

SyncInfo is frequency hopping information of Aux_Sync_indication
Once one is properly obtained, there is no more need to obtain further in the Acceptor's position.
BIGInfo is frequency hopping information of BIS stream TV or raspberry, instead of smartphone, may perform PAST :
In this case, display UI of smartphone cannot be used.

Synchronized = tuned

[FIG. 17]

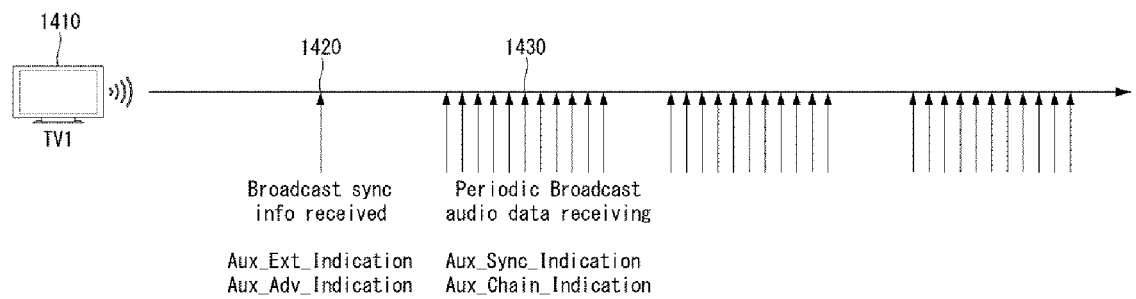

[FIG. 18]

| Data Type | Octets | Description | Req. |
|---|---|---|---|
| <<BIGInfo>> | 1 - 2 | BIG_Offset | M |
| | 3 - 14 | BIG_Parameters | M |
| | 15 - 18 | SeedAccessAddress | M |
| | 19 - 20 | BaseCRCInit | M |
| | 21 - 25 | SDU_Config | M |
| | 26 - 30 | bisPayloadCounter | M |
| | 31 - 54 | BIG_Encryption | C1 |

[FIG. 19]

| BIG_Parameters | | | | | | |
|---|---|---|---|---|---|---|
| Encryption (1 bit) | RFU (3 bits) | ISO_Interval (12 bits) | RFU (3 bits) | NumBIS (5 bits) | Max_Payload_Size (1 octet) | Sub_Interval (20 bits) |
| | | 1.25ms, 5ms~4s | | 1~31 | 0~251 | usec |

(a)

| BIG_Parameters (Cont.) | | | | | |
|---|---|---|---|---|---|
| BIS_Spacing (20 bits) | NSE (5 bits) | BN (3 bits) | PTO (4 bits) | IRC (4 bits) | PHYPHY (8 bits) |
| usec, BIS anchor Point interval | 1~31 | Burst# | PreTransmissionOffset | | ImmediateRepetitionCount |

(b)

| SDU_Config Parameters | | | |
|---|---|---|---|
| ISOAL_PDU_Type (1 bit) | RFU (7 bits) | Max_SDU_Size (12 bits) | SDU_Interval (20 bits) |
| Framed/Unframed | | 0x000~0xFFF | msec, SDU interval 1m ~ 1.048575sec |

(c)

[FIG. 20]
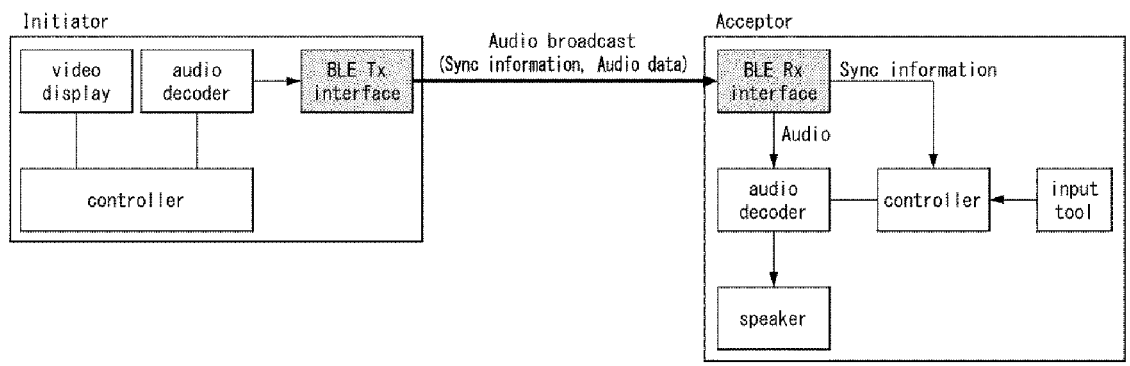
[FIG. 21]
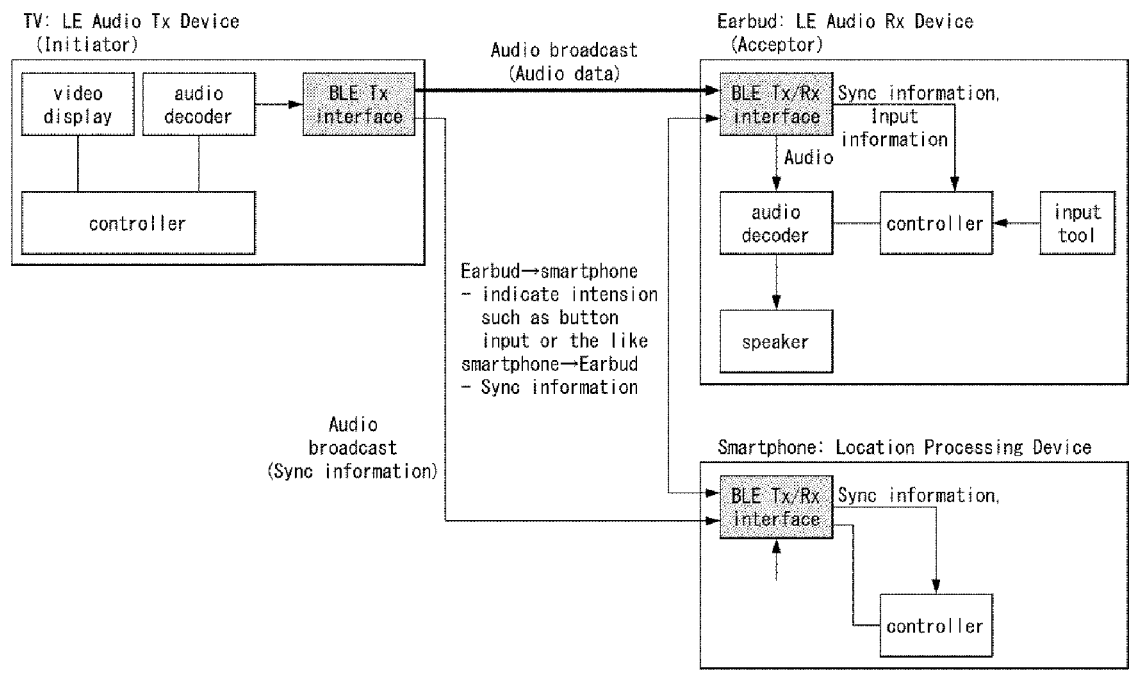

[FIG. 22]
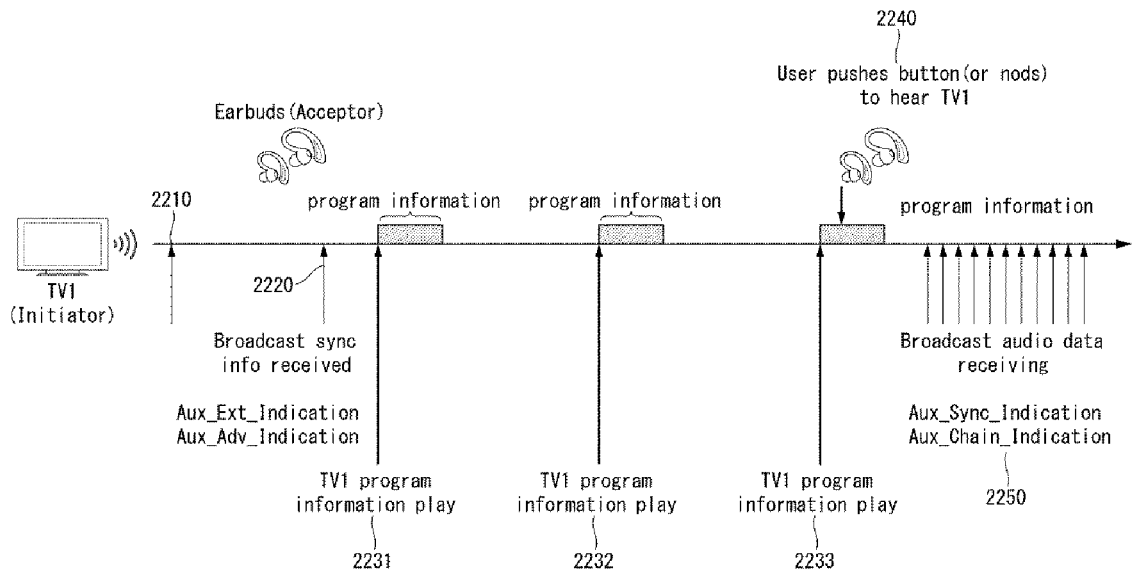
[FIG. 23]
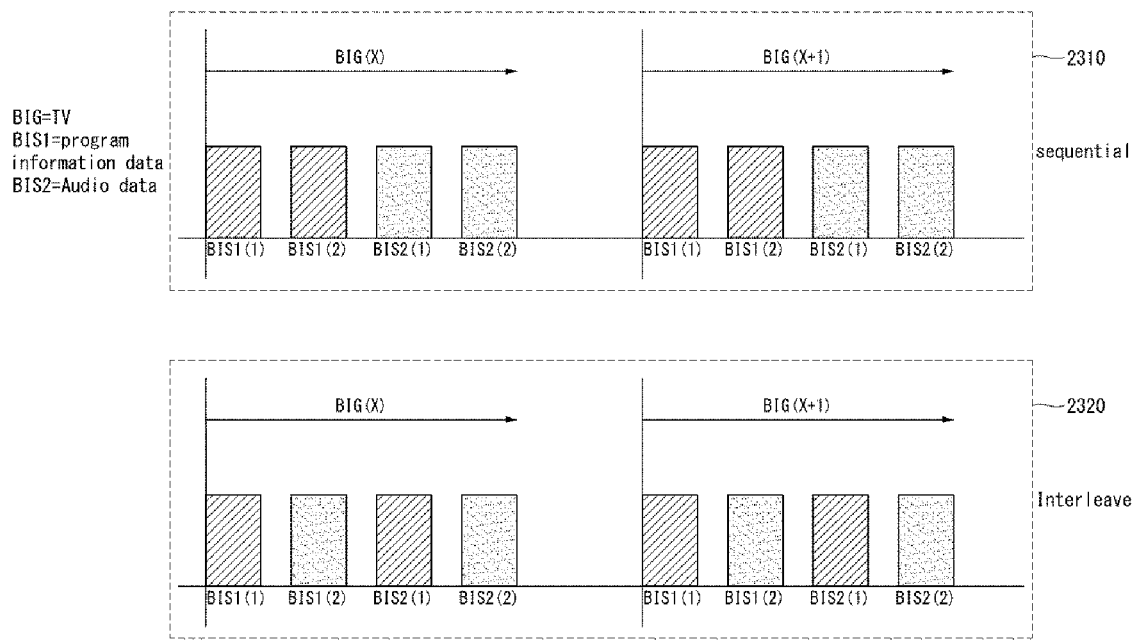
BIG:Broadcast Isochronous Group
BIG:Broadcast Isochronous Stream

[FIG. 24]
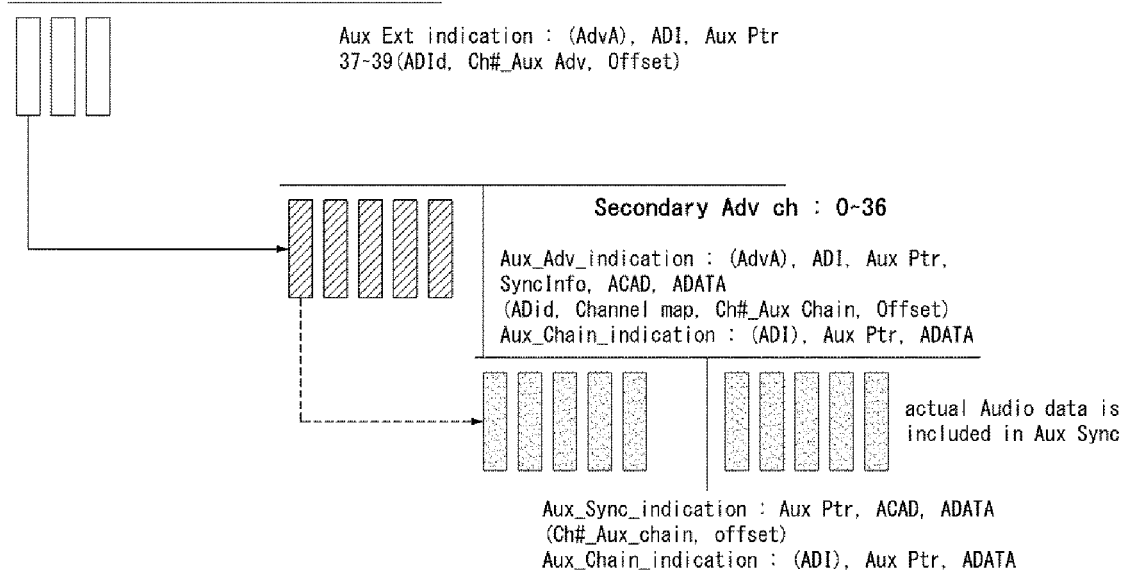
[FIG. 25]
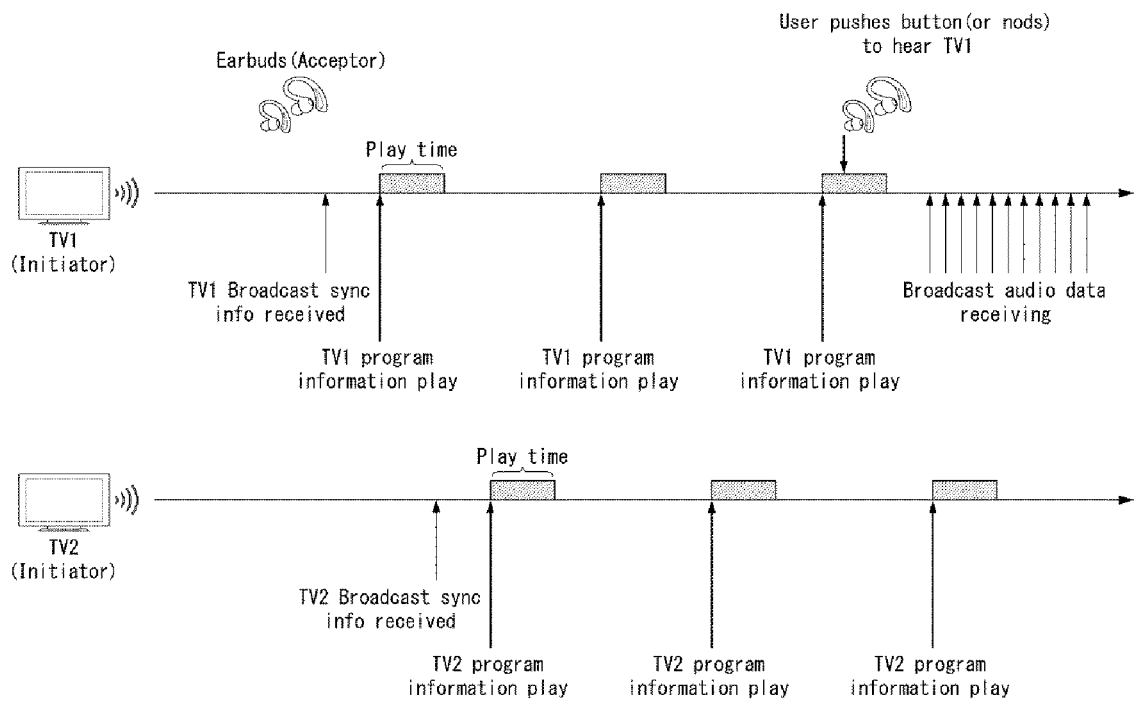

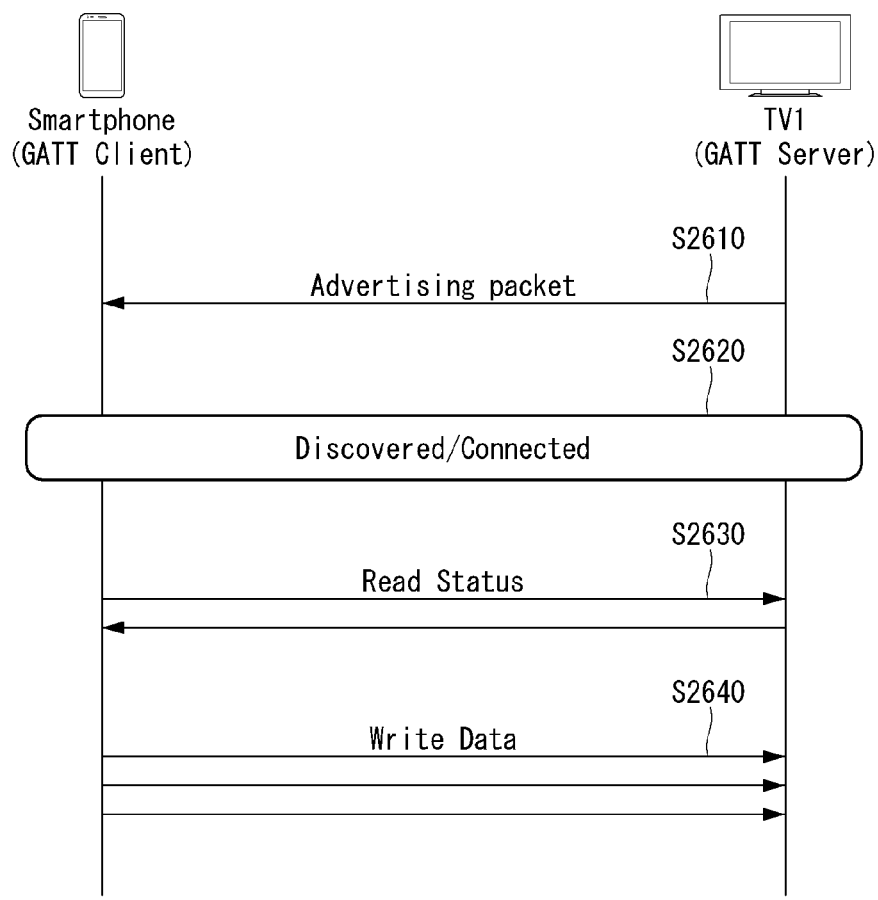

[FIG. 27]
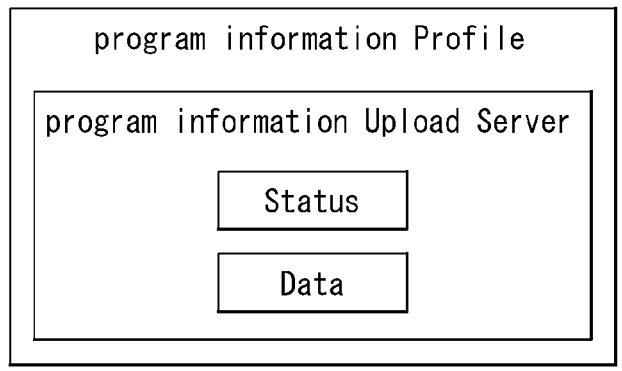
| Characteristic | Parameter |
|---|---|
| Status(Read) | program information name, upload date, version |
| Data(Write) | Seq#, program information data |
[FIG. 28]
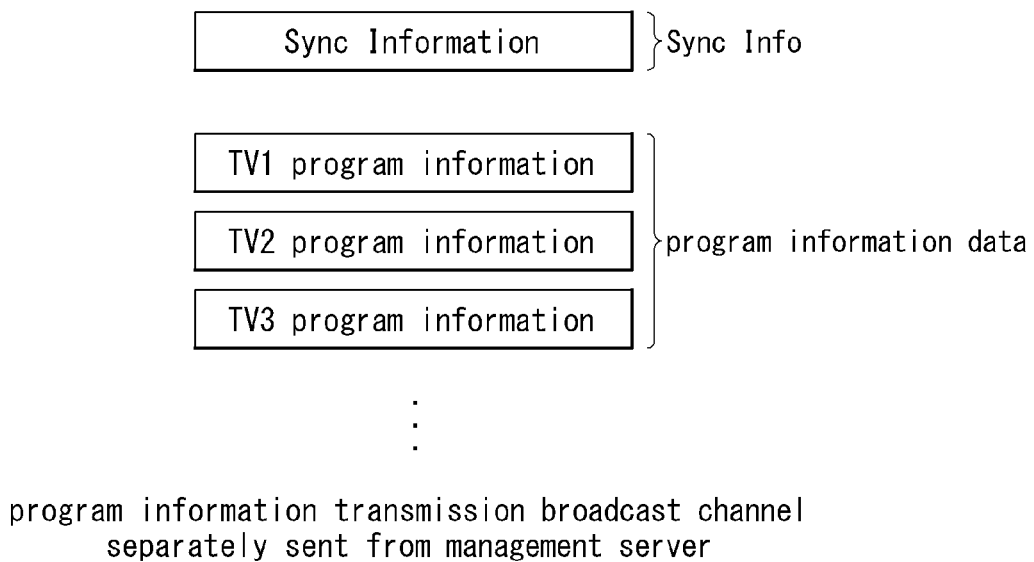
program information transmission broadcast channel
separately sent from management server

[FIG. 29]
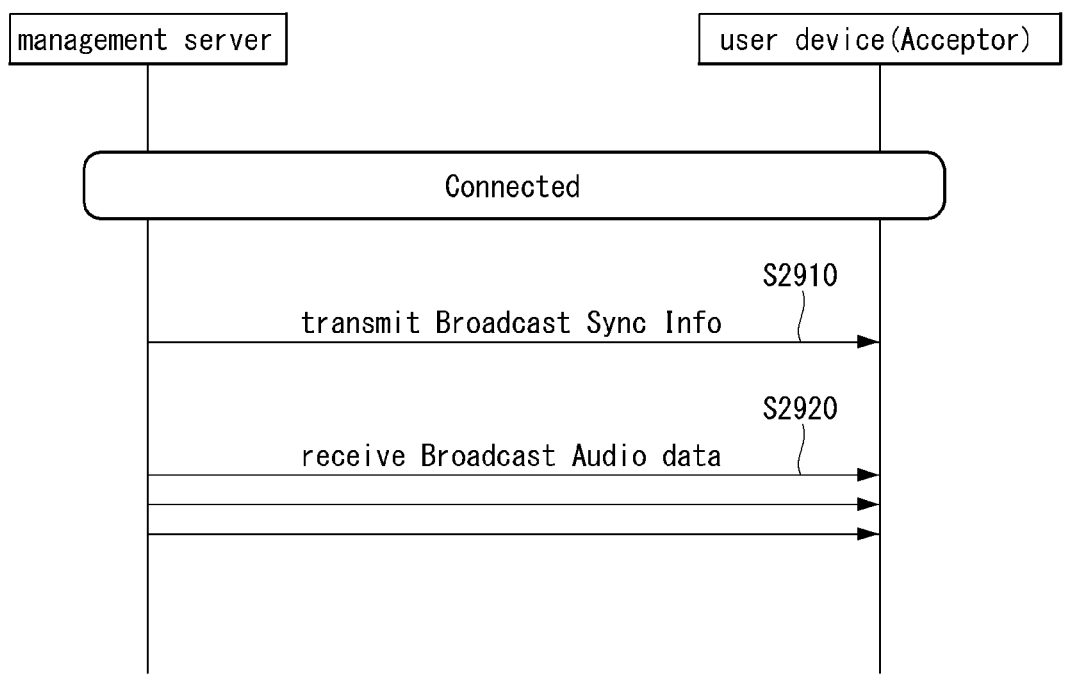

[FIG. 30]
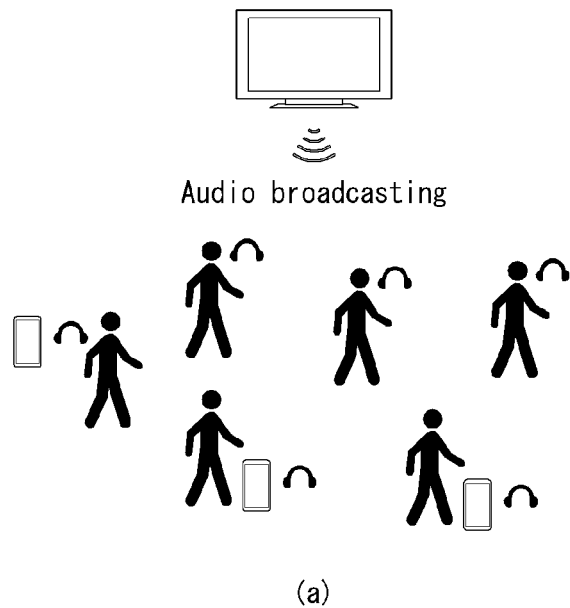
(a)
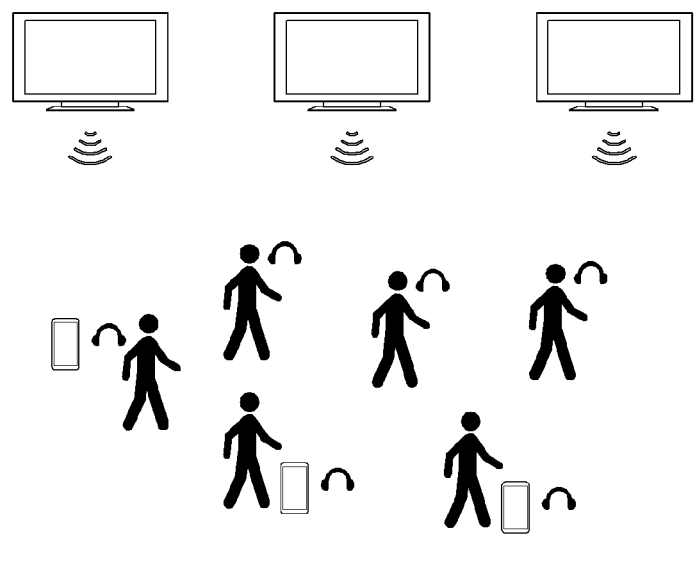
(b)

[FIG. 31]
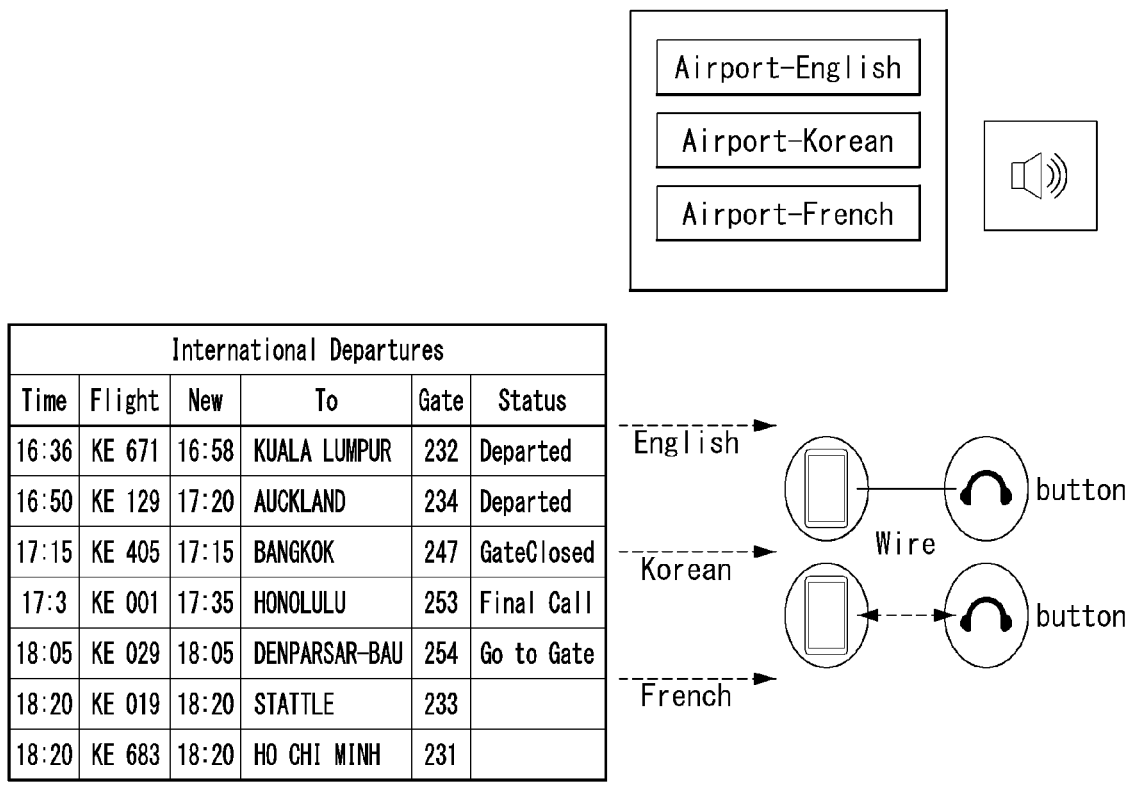

[FIG. 32]
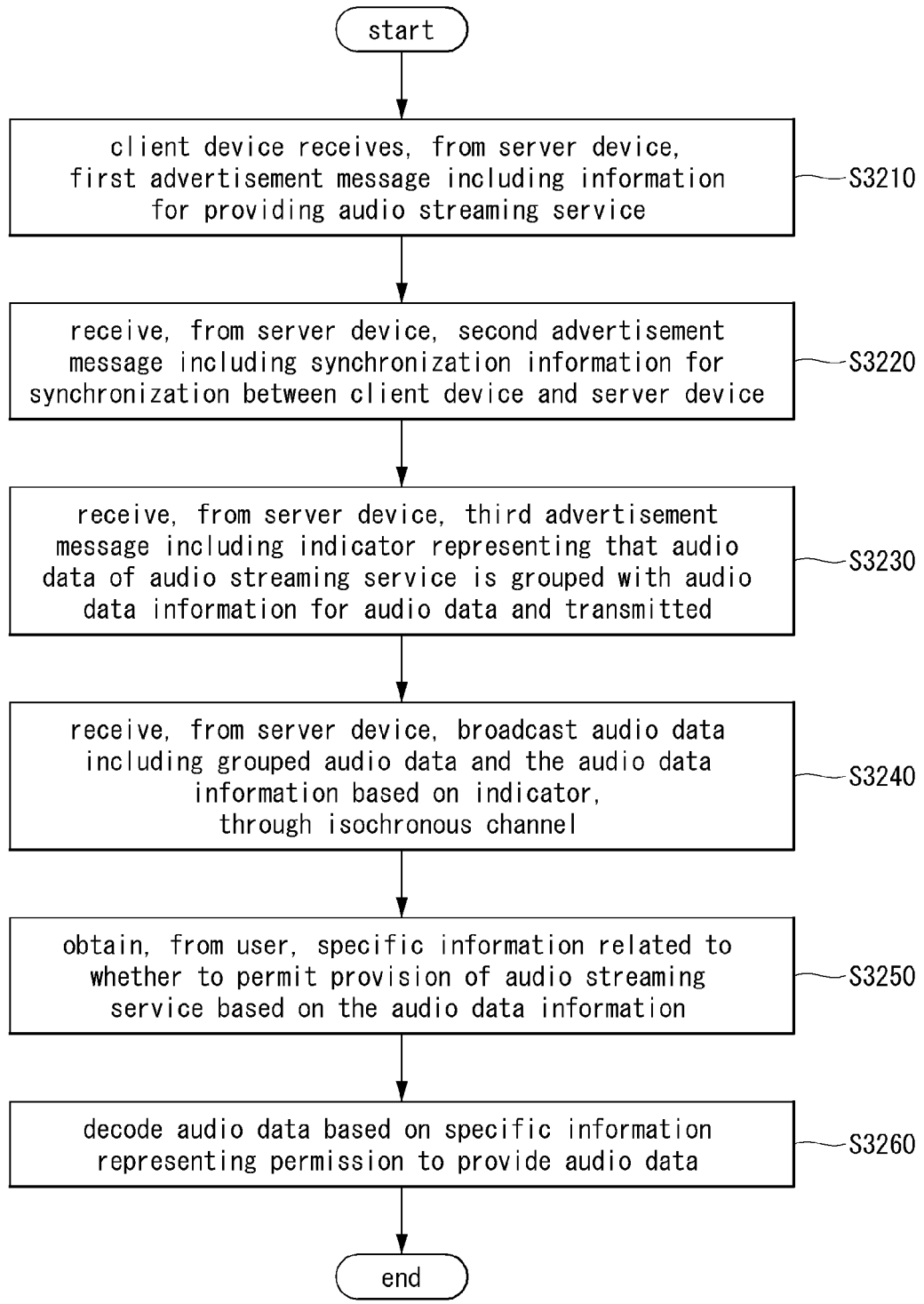

[FIG. 33]
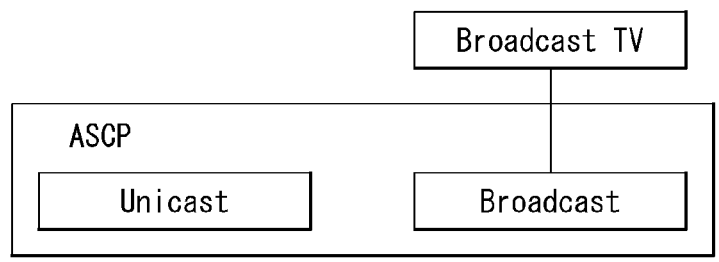
[FIG. 34]
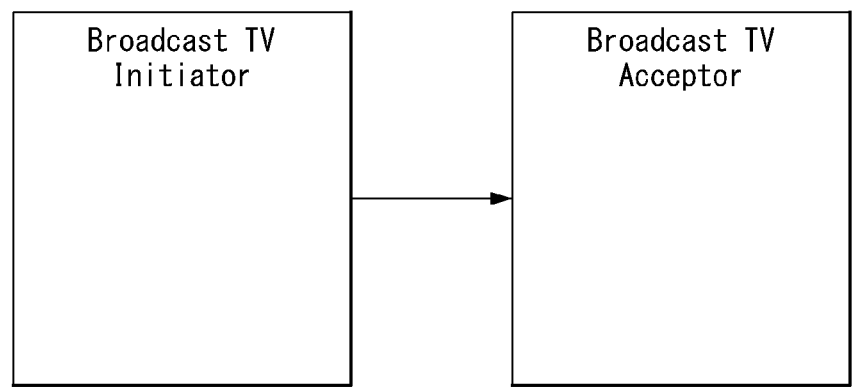

[FIG. 35]
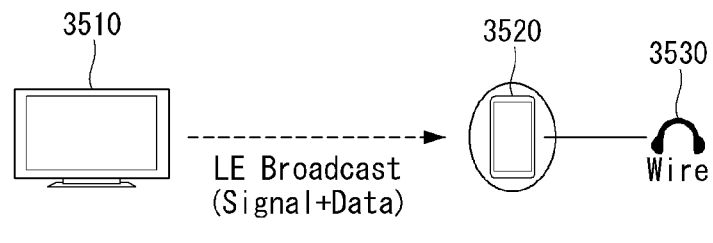
(a)
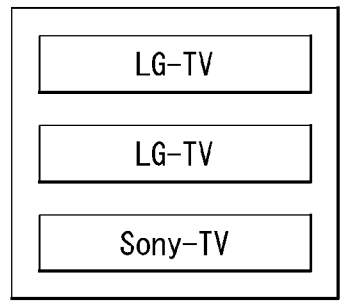
(b)
[FIG. 36]

[FIG. 37]
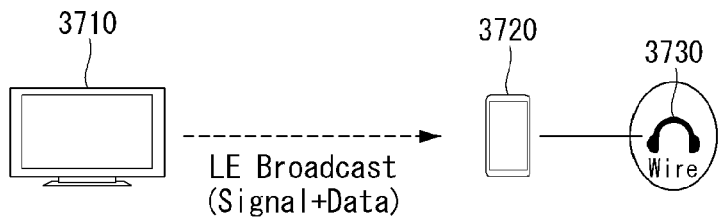
[FIG. 38]
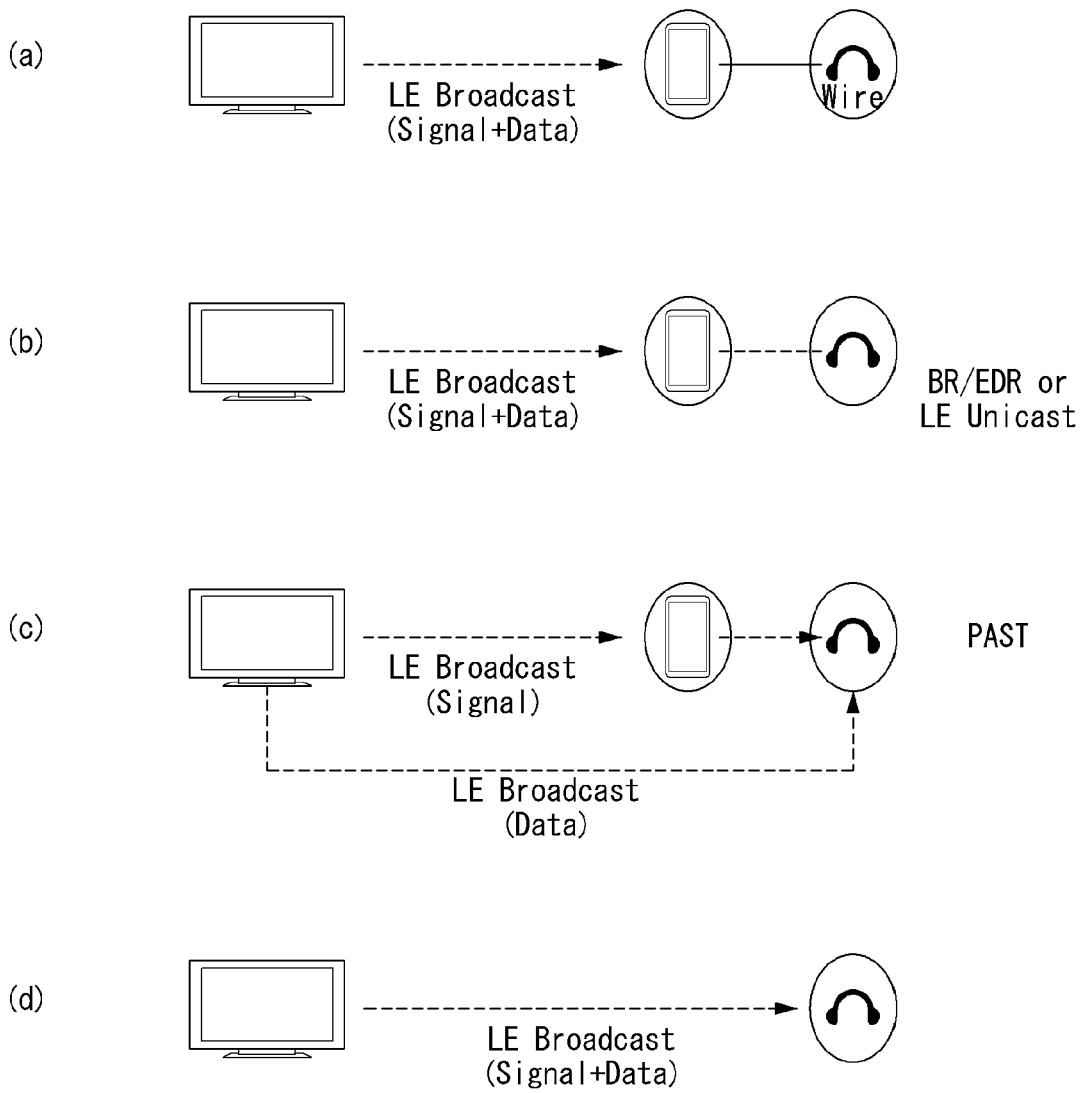

[FIG. 39]
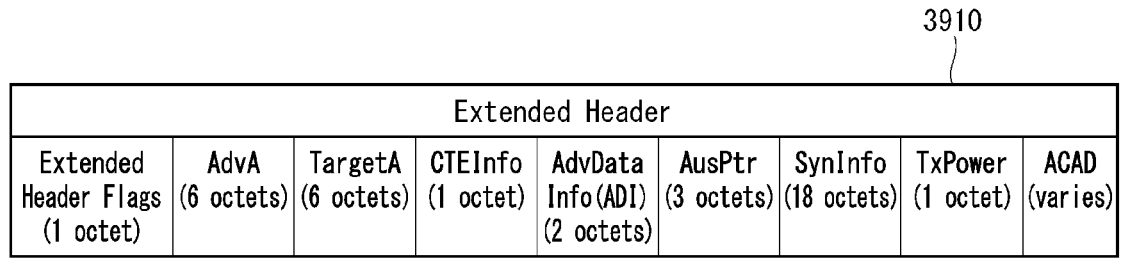
(a)
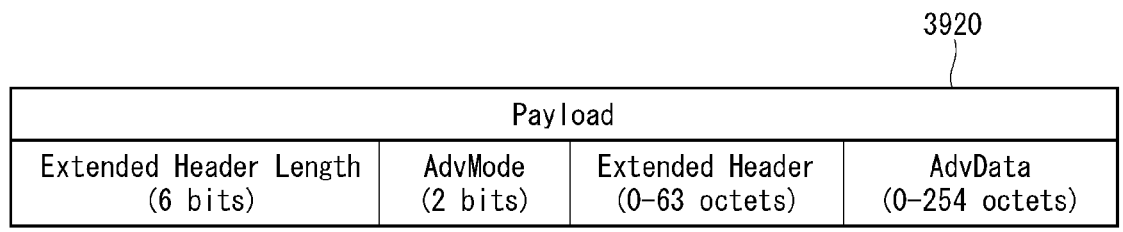
(b)
[FIG. 40]
| | | Common Extended Advertising Payload Format fields | | | | | | | | |
|---|---|---|---|---|---|---|---|---|---|---|
| Adv Mode | Event Type | AdvA | TargetA | CTE Info | ADI | Aux Ptr | Sync Info | Tx Power | ACAD | Adv Data |
| 00b | Non-Connectable and Non-Scannable Undirected or Directed | X | X | O | X | O | X | O | O | O |
| 01b-11b | RFU | | | | | | | | | |

[FIG. 41]
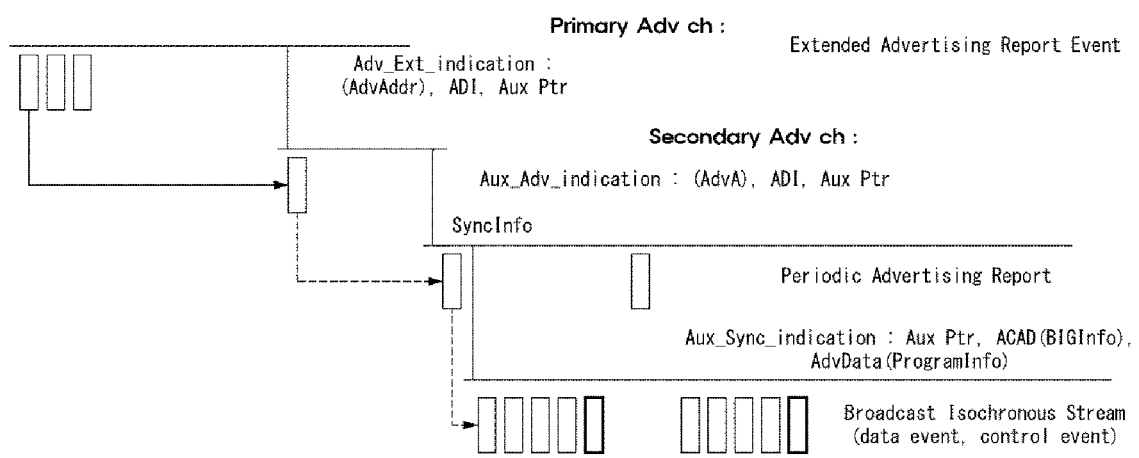

METHOD FOR RECEIVING AUDIO DATA BY USING BLUETOOTH TECHNOLOGY, AND DEVICE THEREFOR

This application is the National Stage filing under 35 U.S.C. 371 of International Application No. PCT/KR2020/003270, filed on Mar. 9, 2020, which claims the benefit of Korean Application No. 10-2019-0026512, filed on Mar. 7, 2019, the contents of which are all hereby incorporated by reference herein in their entirety.

TECHNICAL FIELD

The present disclosure relates to a method and an apparatus for receiving audio data using Bluetooth technology, short-range communication technology for a wireless communication system, and, more particularly, a method and an apparatus for receiving audio data based on information on the audio data using Bluetooth low energy technology.

Background Art

Bluetooth is a short-range wireless technology standard that may wirelessly connect various types of devices and allows them to exchange data over short distances. To enable wireless communication between two devices using Bluetooth communication, a user has to perform the process of discovering Bluetooth devices to communicate with and making a connection request. As used herein, the term "device" refers to an appliance or equipment.

In this case, the user may discover a Bluetooth device according to a Bluetooth communication method intended to be used with the Bluetooth device using the Bluetooth device, and then perform a connection with the Bluetooth device.

The Bluetooth communication method may be divided into as a BR/EDR method and an LE method. The BR/EDR method may be called a Bluetooth Classic method. The Bluetooth Classic method includes a Bluetooth technology led from Bluetooth 1.0 and a Bluetooth technology using an enhanced data rate (EDR) supported by Bluetooth 2.0 or a subsequent version.

A BLE technology applied, starting from Bluetooth 4.0, may stably provide information of hundreds of kilobytes (KB) at low power consumption. Such a BLE technology allows devices to exchange information with each other using an attribute protocol. The BLE method may reduce energy consumption by reducing the overhead of a header and simplifying the operation.

Some of the Bluetooth devices do not have a display or a user interface. The complexity of a connection, management, control, and a disconnection between various Bluetooth devices and Bluetooth devices using similar technologies is increasing.

Bluetooth supports a high speed at a relatively low cost with relatively low power consumption. However, Bluetooth is appropriately used within a limited space because it has a maximum transmission distance of 100 m.

DISCLOSURE

Technical Problem

An aspect of the present disclosure provides a method for receiving audio data by using Bluetooth technology and a device therefor.

Another aspect of the present disclosure provides a method for receiving audio data information for audio data received from server devices and a device therefor.

Another object of the present disclosure provides a method for determining whether to receive audio data based on audio data information, and a device therefor.

Objects of the present disclosure are not limited to the above-mentioned objects. That is, other objects that are not mentioned may be obviously understood by those skilled in the art to which the present disclosure pertains from the following description.

Technical Solution

The present disclosure provides a method for receiving audio data using Bluetooth Low Energy technology.

Specifically, in the present disclosure, a method for receiving audio data using Bluetooth Low Energy technology, the method performed by a client device comprising: receiving, from a server device, a first advertisement message including information for providing an audio streaming service; receiving, from the server device, a second advertisement message including synchronization information for synchronization between the client device and the server device; receiving, from the server device, a third advertisement message including an indicator representing that audio data of the audio streaming service is grouped with audio data information for the audio data and transmitted; receiving, from the server device, broadcast audio data including the grouped audio data and the audio data information based on the indicator, through an isochronous channel; obtaining, from an user, specific information related to whether to permit a provision of the audio streaming service based on the audio data information; and decoding the audio data based on the specific information representing permission to provide the audio data.

Furthermore, in the present disclosure, further comprising: decoding the audio data information, wherein only the audio data information among the audio data and the audio data information is decoded before the specific information is obtained from the user.

Furthermore, in the present disclosure, further comprising: outputting the decoded audio data information.

Furthermore, in the present disclosure, wherein the synchronization information includes timing information of the broadcast audio data and frequency hopping information for reception of the audio data.

Furthermore, in the present disclosure, wherein a grouping identifier (ID) for identifying the broadcast audio data is assigned to the broadcast audio data, wherein an audio data ID for identifying the audio data is assigned to the audio data, and wherein an audio data ID for identifying the audio data information is assigned to the audio data information.

Furthermore, in the present disclosure, wherein the audio data and the audio data information are interleaved and grouped.

Furthermore, in the present disclosure, further comprising: establishing a connection with the server device; transmitting, to the server device, a read request message requesting to read state information of the audio data information stored in a first specific characteristic of the server device, wherein the state information includes at least one of name information of the audio data, date information at which the audio data is stored in the first specific characteristic, or version information of the audio data; and receiving, from the server device, a read response message including the status information.

Furthermore, in the present disclosure, transmitting, to the server device, a write request message for requesting to write characteristic value related to changed audio data information to a second specific characteristic of the service device, in order to change the audio data information, based on based on the state information, wherein the write request message includes a part of data consisting of the changed audio data information; and receiving, from the server device, a write response message in response to the write request message.

Furthermore, in the present disclosure, wherein each of the write request messages includes sequence number information for the part of the data.

Furthermore, in the present disclosure, further comprising: receiving, from a management server that manages a plurality of server devices including the server device, an entire synchronization information related to synchronization between the plurality of server devices and the client device, wherein the entire synchronization information includes synchronization information for each of the plurality of server devices.

Furthermore, in the present disclosure, wherein the synchronization information for each of the plurality of server devices is previously stored in the management server.

Furthermore, in the present disclosure, wherein the audio data is audio data related to a specific program provided by the server device, and wherein the audio data information indicates a title of the specific program.

Furthermore, in the present disclosure, further comprising: measuring a received signal strength of the first advertisement message, wherein based on the received signal strength of the first advertisement message being greater than or equal to a specific threshold value, the first advertisement message is decoded.

Furthermore, in the present disclosure, a client device for receiving audio data using Bluetooth Low Energy technology, the client device comprising: a transmitter for transmitting a radio signal; a receiver for receiving a radio signal; and a processor operatively coupled to the transmitter and the receiver, wherein the processor is configured to control: the receiver to receive, from a server device, a first advertisement message including information for providing an audio streaming service; the receiver to receive, from the server device, a second advertisement message including synchronization information for synchronization between the client device and the server device; the receiver to receive, from the server device, a third advertisement message including an indicator representing that audio data of the audio streaming service is grouped with audio data information for the audio data and transmitted; the receiver to receive, from the server device, broadcast audio data including the grouped audio data and the audio data information based on the indicator, through an isochronous channel; to obtain, from an user, specific information related to whether to permit a provision of the audio streaming service based on the audio data information; and to decode the audio data based on the specific information representing permission to provide the audio data.

Advantageous Effects

The present disclosure has an effect of receiving audio data using Bluetooth technology.

In addition, the present disclosure has an effect of receiving audio data information for audio data received from server devices.

In addition, the present disclosure has an effect of determining whether to receive audio data based on audio data information.

Effects which may be achieved by the present disclosure are not limited to the above-mentioned effects. That is, other objects that are not mentioned may be obviously understood by those skilled in the art to which the present disclosure pertains from the following description.

DESCRIPTION OF DRAWINGS

FIG. 1 is a schematic view illustrating an example of a wireless communication system using a Bluetooth low energy technology to which the present disclosure is applicable.

FIG. 2 illustrates an example of an internal block diagram of a device capable of implementing methods proposed by the present disclosure.

FIG. 3 illustrates an example of a Bluetooth communication architecture to which methods proposed by the present disclosure may be applied.

FIG. 4 illustrates an example of a structure of a generic attribute profile (GATT) of Bluetooth low energy.

FIG. 5 is a flowchart showing an example of a connection procedure method in Bluetooth low energy technology to which the present disclosure may be applied.

FIG. 6 illustrates characteristics of an audio signal.

FIG. 7 illustrates an example of a home ecosystem for applications where an isochronous channel may be used.

FIG. 8 illustrates an example of a Generic Audio Middleware (GAM) protocol stack to which the present disclosure may be applied.

FIG. 9 illustrates an example in which a client device discovers a device without filtering.

FIG. 10 illustrates a problem of a case in which a plurality of service devices are present in the surroundings of a client device.

FIG. 11 is a diagram illustrating an example of a method of transmitting a periodic advertisement message using Bluetooth low energy.

FIG. 12A shows examples of a PDU format of an advertisement message transmitted by a server device.

FIG. 12B is a diagram showing an example of an advertisement message transmission timing.

FIG. 13 is a diagram illustrating an example in which audio data transmission is performed using Bluetooth low energy.

FIG. 14 shows an example of an audio data transmission method using Bluetooth low energy.

FIG. 15 shows an example of an audio data transmission method using Bluetooth low energy.

FIG. 16 shows an example of a method of transmitting audio data using Bluetooth low energy.

FIG. 17 is a diagram illustrating an example of a method of transmitting audio data using Bluetooth low energy.

FIG. 18 is a diagram illustrating an example of fields (octets) included in BIGINFO.

FIG. 19 is a diagram illustrating an example of a BIG parameter field and an SDU_Config field showing an example of a specific field included in BIG synchronization information.

FIG. 20 is a diagram showing an example in which a method proposed in the present disclosure is performed.

FIG. 21 is a diagram showing an example in which a method proposed in the present disclosure is performed.

FIG. 22 is a diagram illustrating an example in which an audio data transmission method based on audio data information proposed in the present disclosure is performed.

FIG. 23 is a diagram illustrating an example of a method in which a server device transmits audio data and audio data information.

FIG. 24 is a diagram illustrating an example of a method in which a server device transmits audio data and audio data information.

FIG. 25 is a diagram illustrating an example in which an audio data transmission method based on audio data information proposed in the present disclosure is performed.

FIGS. 26 and 27 are diagrams illustrating an example of a method in which a client device sets audio data information to a server device.

FIGS. 28 and 29 are diagrams illustrating an example of a method in which a management server device provides synchronization information of server devices to a client device.

FIG. 30 shows examples in which a method for receiving audio data using a Bluetooth technology proposed in the present disclosure is performed.

FIG. 31 shows an example in which a method for receiving audio data using a Bluetooth technology proposed in the present disclosure is performed.

FIG. 32 is a diagram illustrating an example of an operation implemented in a client device for receiving audio data using a Bluetooth technology proposed in the present disclosure.

FIG. 33 is a diagram illustrating a hierarchical structure of a broadcast profile.

FIG. 34 illustrates a relationship between a broadcast TV initiator and a broadcast TV acceptor.

FIG. 35 shows an example of a scenario to which a broadcast TV audio profile may be applied.

FIG. 36 shows an example in which an initiator notifies a user of information on a broadcast program based on program information.

FIG. 37 shows another example of a scenario to which a broadcast TV audio profile may be applied.

FIG. 38 shows various examples of a broadcast TV scenario device setting method.

FIG. 39 shows an example of configuring a data field included in an extended advertisement PDU.

FIG. 40 shows an example of configuring a data field included in AUX_SYN_IND_PDU.

FIG. 41 shows an example of BLE broadcast audio operation.

MODE FOR DISCLOSURE

In order to help understanding of the present disclosure, the accompanying drawings which are included as a part of the Detailed Description provide embodiments of the present disclosure and describe the technical features of the present disclosure together with the Detailed Description. Like reference numerals principally designate like elements throughout the specification. Further, in describing the present disclosure, a detailed explanation of known related technologies may be omitted to avoid unnecessarily obscuring the subject matter of the present disclosure. Further, it is noted that the accompanying drawings are only for easily understanding the spirit of the present disclosure and it should not be interpreted that the spirit of the present disclosure is limited by the accompanying drawings.

Hereinafter, a method and an apparatus related with the present disclosure will be described in more detail with reference to drawings. In addition, a general term used in the present disclosure should be interpreted as defined in a dictionary or contextually, and should not be interpreted as an excessively reduced meaning. Further, a singular form used in the present disclosure may include a plural form if there is no clearly opposite meaning in the context. In the present application, a term such as "comprising" or "including" should not be interpreted as necessarily including all various components or various steps disclosed in the specification, and it should be interpreted that some component or some steps among them may not be included or additional components or steps may be further included. Suffixes "unit", "module", and "section" for components used in the following description are given or mixed in consideration of easy preparation of the specification only and do not have their own distinguished meanings or roles. The terms "first", "second", and the like are used to differentiate a certain component from other components, but the scope of should not be construed to be limited by the terms.

FIG. 1 is a schematic view illustrating an example of a wireless communication system using a Bluetooth low energy technology to which the present disclosure is applicable.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Also, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 120 may operate as a client device in a relationship with other device, and the client device may operate as a server device in a relationship with other device. That is, in the BLE communication system, any one device may operate as a server device or a client device, or may operate as both a server device and a client device if necessary.

The server device 120 may be expressed as a data service device, a slave device, a slave, a server, a conductor, a host device, a gateway, a sensing device, a monitoring device, a first device, a second device, etc.

The client device 110 may be expressed as a master device, a master, a client, a member, a sensor device, a sink device, a collector, a third device, a fourth device, etc.

The server device and the client device correspond to main components of the wireless communication system and the wireless communication system may include other components other than the server device and the client device.

The server device refers to a device that receives data from the client device, communicates directly with the client device, and provides data to the client device through a response when receiving a data request from the client device.

Further, the server device sends a notice/notification message and an indication message to the client device in order to provide data information to the client device. In addition, when the server device transmits the indication message to the client device, the server device receives a confirm message corresponding to the indication message from the client device.

Further, the server device may provide the data information to a user through a display unit or receive a request input from the user through a user input interface in the process of transmitting and receiving the notice, indication, and confirm messages to and from the client device.

In addition, the server device may read data from a memory unit or write new data in the corresponding memory unit in the process of transmitting and receiving the message to and from the client device.

Further, one server device may be connected to multiple client devices and may be easily reconnected to the client devices by using bonding information.

The client device 120 refers to a device that requests the data information or data transmission to the server device.

The client device receives the data from the server device through the notice message, the indication message, etc., and when receiving the indication message from the server device, the client device sends the confirm message in response to the indication message.

Similarly, the client device may also provide information to the user through the display unit or receive an input from the user through the user input interface in the process of transmitting and receiving the messages to and from the server device.

In addition, the client device may read data from the memory unit or write new data in the corresponding memory unit in the process of transmitting and receiving the message to and from the server device.

Hardware components such as the display unit, the user input interface, and the memory unit of the server device and the client device will be described in detail in FIG. 2.

Further, the wireless communication system may configure personal area networking (PAN) through Bluetooth technology. As an example, in the wireless communication system, a private piconet between the devices is established to rapidly and safely exchange files, documents, and the like.

FIG. 2 illustrates an example of an internal block diagram of a device capable of implementing methods proposed by the present disclosure.

As shown in FIG. 2, the server device 110 includes a display unit 111, a user input interface 112, a power supply unit 113, a processor (or controller) 114, a memory unit 115, a Bluetooth interface 116, another interface 117, and a communication unit (or transmission/reception unit) 118.

The display unit 111, user input interface 112, power supply unit 113, processor 114, memory unit 115, Bluetooth interface 116, another interface 117, and communication unit 118 are functionally interconnected so as to perform a method according to an embodiment of the present disclosure.

Furthermore, the client device 120 includes a display unit 121, a user input interface 122, a power supply unit 123, a processor 124, a memory unit 125, a Bluetooth interface 126, and a communication unit (or transmission/reception unit) 127.

The display unit 121, user input interface 122, power supply unit 123, processor 124, memory unit 125, Bluetooth interface 126, and communication unit 127 are functionally interconnected so as to perform a method according to an embodiment of the present disclosure.

The Bluetooth interface 116, 126 refers to a unit (or module) capable of transmitting a request/response, command, notification, indication/confirm message, or data between devices using the Bluetooth technology.

The memory 115, 125 is implemented in various types of devices and refers to a unit in which various data is stored.

The processor 114, 124 refers to a module for controlling an overall operation of the server device 110 or the client device 120, and controls the server device or the client device in order in order to request the transmission of a message through the Bluetooth interface or other interface and to process a received message.

The processors 114 and 124 may be represented by a control section, a control unit, a controller, and the like.

The processors 114 and 124 may include an application-specific integrated circuit (ASIC), another chipset, a logic circuit, and/or a data processing device.

The processors 114 and 124 control the communication unit to receive an Advertisement message from the server device 110, transmit a Scan Request message to the server device 110, control the communication unit to receive a Scan Response message from the server device 110 in response to the scan request, and control the communication unit to transmit a Connect Request message to the server device 110 in order to establish a Bluetooth connection with the server device 110.

In addition, after a Bluetooth LE connection is established through the connection procedure, the processors 114 and 124 control the communication unit so as to read or write data from or in the server device 110 using an attribute protocol.

The memory units 115 and 125 may include a read-only memory (ROM), a random access memory (RAM), a flash memory, a memory card, a storage medium, and/or other storage devices.

The communication units 118 and 127 may include a baseband circuit for processing a radio signal. When the embodiment is implemented by software, the aforementioned technique may be implemented by a module (a process, a function, and the like) that performs the aforementioned function. The module may be stored in the memory unit and executed by the processor.

The memory units 115 and 125 may be positioned inside or outside the processors 114 and 124 and connected with the processors 114 and 124 by various well-known means.

The display units 111 and 121 refer to modules for providing state information of the device and message exchange information to the user through a screen.

The power supply units 113 and 123 refer to modules that receive external power and internal power under the control of the control unit and supply power required for operating each of the components.

As described above, the BLE technology may have a small duty cycle and significantly reduce power consumption through low data rate.

FIG. 3 illustrates an example of a Bluetooth communication architecture to which methods proposed by the present disclosure may be applied.

Specifically, FIG. 3 illustrates an example of an architecture of Bluetooth low energy (LE).

As shown in FIG. 3, the BLE structure includes a controller stack capable of processing a wireless device interface for which timing is critical and a host stack capable of processing high level data.

The controller stack may also be called a controller. In order to avoid confusion with the processor, that is, an internal element of the device described with reference to FIG. 2, however, the controller stack may be preferably used below.

First, the controller stack may be implemented using a communication module which may include a Bluetooth wireless device and a processor module which may include a processing device, such as a microprocessor.

The host stack may be implemented as part of an OS operating on the processor module or as a package instance on an OS.

In some cases, the controller stack and the host stack may operate or may be performed on the same processing device within the processor module.

The host stack includes a generic access profile (GAP) 310, GATT based profiles 320, a generic attribute profile (GATT) 330, an attribute protocol (ATT) 340, a security manager (SM) 350, and a logical link control and adaptation protocol (L2CAP) 360. The host stack is not limited to the aforementioned composition, but may include various protocols and profiles.

The host stack multiplexes various protocols and profiles provided by that Bluetooth specification using the L2CAP.

First, the L2CAP 360 provides one bilateral channel for sending data to according to a specific protocol or specific profile.

The L2CAP is capable of multiplexing data between upper layer protocols, segmenting or reassembling packages, and managing multicast data transmission.

BLE uses three fixed channels for respective signaling, a security manager, and an attribute protocol.

BR/EDR uses a dynamic channel and supports a protocol service multiplexer, retransmission, streaming mode.

The SM 350 authenticates a device, which is a protocol for providing a key distribution.

The ATT 340 relies on a server-client structure, which defines rules for a corresponding device for data access. Six message types are defined: Request, Response, Command, Notification, Indication, and Confirmation.

①Request and Response message: the Request message is used when a client device requests specific information from a server device, and the Response message is used in response to a Request message, which is transmitted from the server device to the client device.

②Command message: The Command message is transmitted from a client device to a server device in order to indicate a command for a specific operation, but the server device does not send a response to a Command message to the client device.

③Notification message: A server device sends this message to a client device in order to provide notification of an event, but the client device does not send a confirmation message to the server device in response to a Notification message.

④Indication and Confirm message: A server device sends this message to a client device in order to provide notification of an event. Unlike in the Notification message, the client device sends a Confirm message to the server device in response to an Indication message.

The generic access profile (GAP) is a layer newly implemented to support the BLE technology, and is used to control the selection of a role for communication between BLE devices and a multi-profile operation.

The GAP is mainly used for device discovery, connection establishment, and security. That is, the GAP defines a method for providing information to a user and also defines the following attribute types.

①Service: A combination of actions related to data, and it defines the basic operation of a device.

②Include: Define a relationship between services.

③Characteristics: A data value used by a service

④Behavior: A format that may be readable by a computer, which is defined by a Universal Unique Identifier (UUID) and a value type.

The GATT-based profiles are dependent on the GATT and are mainly applied to BLE devices. The GATT-based profiles may include Battery, Time, FindMe, Proximity, Object Delivery Service and so on. More specific descriptions of the GATT-based profiles are as follows.

Battery: A method for exchanging battery information.

Time: A method for exchanging time information.

FindMe: A method for providing an alarm service according to the distance.

Proximity: A method for exchanging battery information.

Time: A method for exchanging time information

The GATT may be used as a protocol by which to describe how the ATT is utilized at the time of composing services. For example, the GATT may be used to define how the ATT profiles are grouped together with services and to describe characteristics associated with the services.

Therefore, the GATT and the ATT describe device statuses and services, and how features are associated with each other and how they are used.

The controller stack includes a physical layer 390, a link layer 380, and a host controller interface 370.

The physical layer 390 (or a wireless transmission and reception module) sends and receives radio signals of 2.4 GHz, and uses GFSK modulation and frequency hopping utilizing 40 RF channels.

The link layer 380 sends or receives Bluetooth packets.

Furthermore, the link layer establishes a connection between devices after performing the advertising and scanning function using three advertising channels, and provides a function of exchanging a maximum of 42 bytes of data packets through 37 data channels.

The host controller interface (HCI) provides an interface between the host stack and the controller stack so that the host stack may provide commands and data to the controller stack and the controller stack may provide events and data to the host stack.

Hereinafter, the procedure of BLE is described briefly.

The BLE procedure includes a device filtering procedure, an advertising procedure, a scanning procedure, a discovering procedure, and a connecting procedure.

Device Filtering Procedure

The device filtering procedure functions to reduce the number of devices which perform responses to requests, commands, or notification in the controller stack.

All of devices may not need to respond to received requests. Accordingly, the controller stack reduces the number of transmitted requests so that power consumption may be reduced in the BLE controller stack.

An advertising device or a scanning device may perform the device filtering procedure in order to restrict the number of devices which receive advertisement packets, scan requests, or connection requests.

In this case, the advertising device refers to a device which sends an advertisement event, that is, a device which performs advertisement, and is also called an advertiser.

A scanning device refers to a device which performs scanning, that is, a device which sends a scan request.

In the BLE specification, if a scanning device receives part of advertisement packets from an advertising device, the scanning device has to send a scan request to the advertising device.

If the transmission of a scan request is not required as the device filtering procedure is used, however, the scanning device may ignore advertisement packets transmitted by an advertising device.

The device filtering procedure may be used even in the connection request procedure. If device filtering is used for the connection request procedure, the need for sending a response to a connection request may be made unnecessary by ignoring the connection request.

Advertising Procedure

An advertising device performs an advertisement procedure to perform non-directional broadcast using the devices within the range of the advertising device.

In this case, the non-directional broadcast refers to broadcast in all directions rather than broadcast in specific directions.

Unlike the non-directional broadcast, the directional broadcast refers to broadcast in a specific direction. Non-directional broadcast is performed without involving a connection procedure between devices in a listening state (hereinafter referred to as a "listening device").

The advertising procedure is used to establish a BLE to a nearby initiating device.

In some embodiments, the advertising procedure may be used to provide the periodic broadcast of user data to scanning devices which perform listening through an advertising channel.

In the advertising procedure, all of advertisements (or advertisement events) are broadcasted through an advertising physical channel.

An advertising device may receive a scan request from a listening device which performs a listening operation in order to obtain additional user data from the advertising device. In response to the scan request, the advertising device sends a response to the listening device which has sent the scan request through the same advertising physical channel through which the advertising device has received the scan request.

While broadcast user data sent as part of advertising packets forms dynamic data, scan response data is static for the most part.

An advertising device may receive a connection request from an initiating device through an advertising (or broadcast) physical channel. If the advertising device has used a connectable advertisement event and the initiating device has not been filtered by a filtering procedure, the advertising device stops an advertisement and enters connected mode. The advertising device may resume the advertisement after entering the connected mode.

Scanning Procedure

A device performing a scan operation, that is, a scanning device, performs a scanning procedure in order to listen to the non-directional broadcast of user data from advertising devices which use an advertising physical channel.

In order to request additional user data, a scanning device sends a scan request to an advertising device through an advertising physical channel. In response to the scan request, the advertising device includes additional user data requested by the scanning device in a scan response and sends the scan response to the scanning device through the advertising physical channel.

The scanning procedure may be used while a scanning device is connected to another BLE device in a BLE piconet.

If a scanning device receives a broadcast advertising event and stays in initiator mode where a connection request may be initiated, the scanning device may initiate BLE for an advertising device by sending a connection request to the advertising device through an advertising physical channel.

If a scanning device sends a connection request to an advertising device, the scanning device stops the entire scanning for additional broadcast and enters connected mode.

Discovering Procedure

Devices capable of Bluetooth communication (hereinafter referred to as "Bluetooth devices") perform an advertising procedure and a scanning procedure in order to discover devices around the Bluetooth devices or devices to be discovered by other devices within a given area.

The discovering procedure is performed in an asymmetric manner. A Bluetooth device searching for another Bluetooth device nearby is called a discovering device, and performs listening in order to search for devices that advertise advertisement events that may be scanned. A Bluetooth device which may be discovered and used by another device is called a discoverable device. A discoverable device actively broadcasts an advertisement event so that other devices may scan the discoverable device through an advertising (or broadcast) physical channel.

Both of the discovering device and the discoverable device may already have been connected to other Bluetooth devices in a piconet Connecting Procedure A connecting procedure is asymmetric. In the connecting procedure, while a particular Bluetooth device performs an advertising procedure, other Bluetooth devices need to perform a scanning procedure.

In other words, the advertising procedure may be a primary task to be performed, and as a result, only one device may respond to an advertisement. After receiving a connectable advertisement event from an advertising device, the connecting procedure may be initiated by sending a connection request to the advertising device through an advertising (or broadcast) physical channel.

Operation statuses defined in the BLE technology, that is, an advertising state, a scanning state, an initiating state, and a connection state, are described briefly below.

Advertising State

The link layer (LL) enters the advertising state in a command from a host (or stack). If the link layer is in the advertising state, the link layer sends advertising packet data units (PDUs) at advertisement events.

Each advertisement event includes at least one advertising PDU, and the advertising PDU is transmitted through an advertising channel index. Each advertisement event may be previously closed if the advertising PDU is transmitted through each advertising channel index, the advertising PDU is terminated, or the advertising device needs to secure the space in order to perform other functions.

Scanning State

The link layer enters the scanning state in response to a command from a host (or stack). In the scanning state, the link layer listens to advertising channel indices.

The scanning state supports two types: passive and active scanning. The host determines a scanning type.

No separate time or advertising channel index is defined to perform scanning.

In the scanning state, the link layer listens to an advertising channel index for "scanWindow" duration. scanInterval is defined as the interval between the start points of two consecutive scan windows.

If there is no scheduling collision, the link layer has to perform listening in order to complete all of the scanIntervals of scanWindows as commanded by the host. In each scanWindow, the link layer has to scan other advertising channel indices. The link layer uses all of available advertising channel indices.

In the case of passive scanning, the link layer is unable to send any packet, but only receives packets.

In the case of active scanning, the link layer performs listening to the advertising device to rely on the advertising PDU type by which additional information related to the advertising PDUs and advertising device may be requested.

Initiating State

The link layer enters the initiating state in response to a command from a host (or stack).

In the initiating state, the link layer performs listening to advertising channel indices.

In the initiating state, the link layer listens to an advertising channel index for "scanWindow" duration.

Connection State

The link layer enters a connection state when the device performing the connection request, i. E., the initiating device transmits CONNECT_REQ PDU to the advertising device or when the advertising device receives CONNECT_REQ PDU from the initiating device.

After entering the connections state, it is considered that the connection is created. However, it need not be considered so that the connection is established at the time of entering the connections state. An only difference between a newly created connection and the previously established connection is a link layer connection supervision timeout value.

When two devices are connected to each other, two devices play difference roles.

A link layer serving as a master is referred to as the master and a link layer serving as a slave is referred to as the slave. The master controls a timing of a connection event and the connection event refers to a time at which the master and the slave are synchronized.

Hereinafter, a packet defined the Bluetooth interface will be briefly described. BLE devices use packets defined below.

Packet Format

The link layer has only one packet format used for both an advertising channel packet and a data channel packet.

Each packet is constituted by four fields, i.e., a preamble, an access address, a PDU, and a CRC.

When one packet is transmitted in an advertising physical channel, the PDU will become an advertising channel PDU and when one packet is transmitted in a data physical channel, the PDU will become a data channel PDU.

Advertising Channel PDU

The advertising channel PDU includes a 16 bit header and a payload of various sizes.

The PDU type field of an advertising channel included in the header supports PDU types defined in Table 1 below.

TABLE 1

| PDU | | | Permitted PHYs | | |
|---|---|---|---|---|---|
| Type | PDU Name | Channel | LE 1M | LE 2M | LE Coded |
| 0000b | ADV_IND | Primary Advertising | • | | |
| 0001b | ADV_DIRECT_IND | Primary Advertising | • | | |
| 0010b | ADV_NONCONN_IND | Primary Advertising | • | | |
| 0011b | SCAN_REQ | Primary Advertising | • | | |
| | AUX_SCAN_REQ | Secondary Advertising | • | • | • |
| 0100b | SCAN RSP | Primary Advertising | • | | |
| 0101b | CONNECT_IND | Primary Advertising | • | | |
| | AUX_CONNECT_REQ | Secondary Advertising | • | • | • |
| 0110b | ADV_SCAN_IND | Primary Advertising | • | | |

Advertising PDU

The following advertising channel PDU types are called advertising PDUs and are used for specific events.

ADV_IND: a connectable non-directional advertisement event

ADV_DIREC_IND: a connectable directional advertisement event

ADV_NONCONN_IND: a non-connectable non-directional advertisement event

ADV_SCAN_IND: a non-directional advertisement event that may be scanned

The PDUs are transmitted by the link layer in the advertising state and are received by the link layer in the scanning state or initiating state.

Scanning PDUs

The advertising channel PDU type below is called a scanning PDU and is used in the status described below.

SCAN_REQ: transmitted by the link layer in the scanning state and received by the link layer in the advertising state.

SCAN_RSP: transmitted by the link layer in the advertising state and received by the link layer in the scanning state.

Initiating PDUs

The advertising channel PDU type below is called an initiating PDU.

CONNECT_REQ: transmitted by the link layer in the initiating state and received by the link layer in the advertising state.

Data Channel PDU

The data channel PDU may have a 16-bit header and various sizes of payloads and include a message integrity check (MIC) field.

The procedure, the state, the packet format, and the like in the BLE technology, which are described above, may be applied in order to perform methods proposed by the present disclosure.

FIG. 4 illustrates an example of a structure of a generic attribute profile (GATT) of Bluetooth low energy.

Referring to FIG. 4, a structure for exchanging profile data of the Bluetooth low energy may be described.

Specifically, the generic attribute profile (GATT) is a definition of a method in which data is transmitted and received by using services and characteristics between the Bluetooth LE devices.

In general, a Peripheral device (e.g., a sensor device) serves as a GATT server and has a definition of services and characteristics.

A GATT client sends a data request to the GATT server in order to read or write the data and all transactions start at the GATT client and the response is received from the GATT server.

A GATT-based operation structure used in the Bluetooth LE may be based on THE profile, the service, and the characteristic, and may have a vertical structure illustrated in FIG. 5.

The profile may be constituted by one or more services and the service may be constituted by one or more characteristics or other services.

The service may serve to divide data into logical units and include one or more characteristics or other services. Each service has a 16-bit or 128-bit separator called a Universal Unique Identifier (UUID).

The characteristic is a lowest unit in the GATT-based operation structure. The characteristic includes only one datum and has a 16-bit or 128-bit UUID similar to the service.

The characteristic is defined as a value of various information and requires one attribute to contain each information. The characteristic may adopt various consecutive attributes.

The attribute is constituted by four components, which have the following meanings.

handle: Address of attribute
Type: Type of attribute
Value: Value of attribute
Permission: Access authority to attribute FIG. 5 is a flowchart showing an example of a connection procedure method in Bluetooth low power energy technology to which the present disclosure may be applied.

A server transmits to a client an advertisement message through three advertising channels (S5010).

The server may be called an advertiser before connection and called as a master after the connection. As an example of the server, there may be a sensor (temperature sensor, etc.).

Further, the server may be called a scanner before the connection and called as a slave after the connection. As an example of the client, there may be a smartphone, etc.

As described above, in Bluetooth, communication is performed over a total of 40 channels through the 2.4 GHz band. Three channels among 40 channels as the advertising channels are used for exchanging sent and received for establishing the connection, which include various advertising packets.

The remaining 37 channels are used for data exchange after connection to the data channel.

The client may receive the advertisement message and thereafter, transmit the Scan Request message to the server in order to obtain additional data (e.g., a server device name, etc.).

In this case, the server transmits the Scan Response message including the additional data to the client in response to the Scan Request message.

Here, the Scan Request message and the Scan Response message are one type of advertising packet and the advertising packet may include only user data of 31 bytes or less.

Therefore, when there is data in which the size of the data is larger than 3 bytes, but overhead to transmit the data through the connection, the data is divided and sent twice by using the Scan Request message and the Scan Response message.

Next, the client transmits to the server a Connection Request message for establishing a Bluetooth connection with the server (S5020).

Therefore, a Link Layer (LL) connection is established between the server and the client.

Thereafter, the server and the client perform a security establishment procedure.

The security establishment procedure may be interpreted as security simple pairing or may be performed including the same.

That is, the security establishment procedure may be performed through Phase 1 through Phase 3.

Specifically, a pairing procedure (Phase 1) is performed between the server and the client (S5030).

In the pairing procedure, the client transmits a Pairing Request message to the server and the server transmits a Pairing Response message to the client.

Through the pairing procedure, authentication requirements and input (I)/output (O) capabilities and Key Size information are sent and received between the devices. Through the information, which key generation method is to be used in Phase 2 is determined.

Next, as Phase 2, legacy pairing or secure connections are performed between the server and the client (S5040).

In Phase 2, A 128-bit temporary key and a 128-bit short term key (STK) for performing the legacy pairing are generated.

Temporary Key: Key made for creating the STK
Short Term Key (LTK): Key value used for making encrypted connection between devices When the secure connection is performed in Phase 2, a 128-bit long term key (LTK) is generated.

Long Term Key (LTK): Key value used even in later connection in addition to encrypted connection between the devices Next, as Phase 3, a Key Distribution procedure is performed between the server and the client (S5050).

Therefore, the secure connection may be established and the data may be transmitted and received by forming the encrypted link.

Overview of Isochronous Channel

FIG. 6 shows characteristics of an audio signal.

As shown in FIG. 6, in the case of an audio signal, audio streaming data or audio data is periodically generated at an idle event interval.

Audio data is generated periodically (or at a specific time interval) according to the characteristics thereof.

In this case, the specific time interval during which audio data is periodically generated may be represented as an idle event interval.

Audio data is transmitted at an individual idle event interval.

Furthermore, individual audio data may be transmitted throughout part of or the entire event interval.

As shown in FIG. 6, when audio streaming data generated periodically or regularly is transmitted according to the BLE mechanism, an advertisement and scanning procedure, a communication procedure, and a disconnection procedure have to be performed whenever the generated audio data is transmitted or received.

As shown in FIG. 6, however, since audio data is generated at a regular interval for most cases, latency needs to be guaranteed with respect to the transmission of the audio data regardless of the amount of the audio data.

If the advertisement and scanning procedure, the communication procedure, and the disconnection procedure are performed whenever newly generated audio data is transmitted, however, a latency problem occurs during the transmission of the audio data.

If the BLE technology rather than the Bluetooth BR/EDR technology is used, high energy efficiency may be achieved because a relatively small amount of audio data is transmitted through an HA or headset. As described above, however, great overhead is generated because the data channel process of the BLE technology involves advertising, connection, etc. Whenever data is transmitted. Accordingly, latency absolutely required for the transmission of audio data cannot be guaranteed.

Furthermore, the data channel process of the BLE technology involves sending intermittently generated data only when necessary, thereby improving energy efficiency by leading a BLE device in a different time region to deep sleep. Therefore, it may be difficult to apply the data channel process of the BLE technology to the transmission of audio data generated at a regular interval.

For such a reason, it is necessary to define a new mechanism in which periodically generated data, such as audio streams, is transmitted and received using the BLE technology.

In addition, since the operation of the link layer for transmitting an audio signal is not defined, the BLE has difficulty in transmitting an audio signal. Even if the audio signal is transmitted, a procedure for a user device (e.g., a headset, a phone, etc.) transmit the audio signal to a target device by discovering a device capable of receiving and processing the audio signal needs to be defined.

Thus, the present disclosure provides a procedure in which the user device may determine devices capable of recognizing and processing the audio signal of the user and transferring the processed audio signal to the target device in order to control the devices with the voice of the user.

Hereinafter, methods for transmitting and receiving periodically generated data (e.g., audio data, voice data, etc.) using the BLE technology will be described in detail.

That is, in the BLE technology, provided is a method for newly defining a channel for transmitting and receiving the periodically generated data and transmitting periodically generated data within a range that does not impair energy performance of the BLE by additionally defining a mechanism related to the newly defined channel.

Terms including audio stream data, audio data, audio streaming, audio stream, and the like may be interpreted as the same meaning.

Hereinafter, for convenience of understanding, it will be assumed that the terms are unified and used as the audio data.

Isochronous Channel and Definition of a Mechanism Related to Isochronous Channel A new channel, that is, an isochronous channel, is defined to send data generated at a regular interval using the BLE technology.

An isochronous channel is used to send isochronous data to devices using isochronous streams.

Isochronous data refers to data transmitted at a particular time interval, that is, periodically or regularly.

In other words, an isochronous channel may represent a channel for sending and receiving periodically generated data, such as audio data, in the BLE technology.

An isochronous channel may be used to send and receive audio data to and from a single member, three of one or more coordinated members, or a plurality of members.

Furthermore, an isochronous channel corresponds to an isochronous stream, such as an audio stream, or a flushing channel which may be used to send and receive important data in other time regions.

Methods using an isochronous channel described later are used independently of the advertising channel and data channel defined in the existing (v4.2 or earlier) BLE technology.

Furthermore, this document additionally defines a new frequency channel and frequency hopping interval for an isochronous channel.

An isochronous channel enables a conductor to send an isochronous stream such as flushable data (e.g., time-bound audio data) to one or more members using the BLE.

In this case, the conductor may be represented as a master, and the member may be represented as a slave.

Furthermore, an isochronous channel may or may not be configured by security setting.

Furthermore, an isochronous channel may be set up for various topologies to allow the transmission of an isochronous stream between a single conductor and a member, between a single conductor and a coordinated pair of members which generates a stereo audio stream, such as hearing aids or stereo headsets, and between a single conductor and a plurality of members synchronized with the same isochronous stream(s).

In this case, the member may send data to the conductor through an isochronous channel.

Furthermore, the isochronous channel may support the transmission and reception of shared audio, public audio, and broadcast audio as well as the transmission and reception of personal audio.

A procedure for setting up an isochronous channel requires that hierarchy of profile level security and reliability requirements satisfy use cases.

Furthermore, an isochronous channel may be used for various applications, by which a plurality of audio sources and sinks may be set up, and complicated topologies may be set up to allow users to regularly change or share different audio streams.

FIG. 7 illustrates an example of a home ecosystem for applications where an isochronous channel may be used.

That is, FIG. 7 illustrates an example of a space in which multiple audio conductors and members to which the methods proposed by the present disclosure may be applied may move within or outside each other's area.

As illustrated in FIG. 7, the presence of various conductors and members may imply that the isochronous channel is needed as a method for informing the presence of a member so that the member may obtain information required for configuring the isochronous channel.

The isochronous channel may also be used for transmitting and receiving non audio data.

The member may use isochronous channels to determine whether there are notification messages that may include acquisition information from conductors within a BLE communication range.

Further, the member may use the isochronous channels to receive a request for control information or service data from one or one or more devices acting as a remote controller.

FIG. 8 illustrates an example of a Generic Audio Middleware (GAM) protocol stack to which the present disclosure may be applied.

An audio architecture including an Audio Middleware Layer may support unicast and broadcast audios using the BLE.

The audio middleware layer facilitates a transition between connections of audio application programs and may develop a more developed user case.

As illustrated in FIG. 8, by adding an audio middleware layer capable of accessing all audio profiles, the GAM may provide a smooth audio service to the user even in a dynamic and multi-profile environment. Since middleware may handle switching between audio mixing of various user cases and the user cases, each profile may concentrate on a specific function.

Since the GAM may support multiple profiles, the user may select an audio content range and an application program which may seamlessly move between voice operating devices.

The GAM defines announcements for the audio streaming and signal transmission for audio control and data transmission. An application layer defines application signaling and required transmission parameters.

When a plurality of server devices that broadcast audio data exist in the vicinity of a user, many server devices are searched for more than necessary to the user, and the user cannot determine what is audio data the searched server device broadcasts, and the present disclosure proposes a method for solving this problem and a device therefor. Specifically, the present disclosure proposes a method and device for providing information related to audio data provided by each server device to a user when a user searches for server devices around the user.

When a plurality of server devices providing an audio streaming service exist around the user through the method provided herein, there is an effect that a user's peripheral device search may be efficiently performed.

When a user wants to receive audio data broadcast from a peripheral device through a Bluetooth low energy (BLE) audio streaming service, the user's device receives synchronization information (sync information) from a peripheral device and then receives audio data without a separate filtering process. Alternatively, in the case of a device having a UI, such as a smartphone, a specific device that transmits audio data that the user desires to receive should be directly selected from among a plurality of devices searched using the UI. Accordingly, when audio data is immediately listened to without filtering, there is an inconvenience in that audio data that the user does not want is received. In addition, when the user uses the UI mounted in the device, there is an inconvenience in that the user has to separately operate the UI to receive audio data.

In particular, when there is only one device for transmitting audio data around the client device, the user's inconvenience may not be significant. Meanwhile, when there are a plurality of devices transmitting audio data nearby, it is difficult to determine whether the user's device is synchronized with a device among the plurality of devices.

In other words, when there are a plurality of devices around the user, devices more than necessary may be discovered if devices in the vicinity of the user are to be discovered or connections to the devices are to be established using wireless communication technologies.

In what follows, a device transmitting audio data may be referred to as a server, a service device, or an initiator.

Also, a user's device receiving audio data may be referred to as a client, a client device, or an acceptor.

FIG. 9 illustrates an example in which a client device discovers a device without filtering.

FIG. 9(*a*) illustrates a flow diagram of operations performed in a server device.

First, the server device transmits synchronization information to surrounding devices S911.

Next, the server device transmits audio data to the surrounding devices S912.

Here, the server device may transmit synchronization information and audio data to the surrounding devices using a broadcasting method. Also, the server device may repeatedly perform the S911 to S912 operations periodically.

FIG. 9(*b*) illustrates a flow diagram of an operation performed in a client device without a UI.

First, the client device receives synchronization information from the server device S921.

Next, the client device receives audio data from the server device S922.

Here, the client device receives the audio data without filtering S922.

FIG. 9(*c*) illustrates a flow diagram of an operation performed in a client device with a UI.

First, the client device receives synchronization information from the server device S931.

Next, the user may determine, through the UI, whether to receive audio data received without filtering S932. Here, if there exist a plurality of server devices in the vicinity of the client device, a plurality of devices transmitting audio data may be discovered from the display of the client device.

Next, the client device receives audio data from the server device S933.

FIG. 10 illustrates a problem of a case in which a plurality of service devices are present in the surroundings of a client device.

As shown in FIG. 10, in the presence of a plurality of server devices in the vicinity of a client device, all of devices around a user are discovered.

In particular, when surrounding devices are to be discovered through a client device such as a smartphone, the number of devices that may be listed on the display of the client device may be exceeded. Also, the client device displays the name of a discovered device to the user, which makes it difficult to correctly find a specific device transmitting audio data that the user desires to receive.

FIG. 11 is a diagram illustrating an example of a method of transmitting a periodic advertisement message using Bluetooth low energy.

The server device transmits an extended advertisement message including an Aux_Ext_indication type advertisement PDU through a primary physical advertising channel (1101). The primary physical advertising channel may be channels #37 to #39, and the advertisement message may include channel information through which an extended advertisement message is transmitted. The extended advertisement message may include at least one of AdvA, ADI, Aux Ptr, ADId, Ch #_Aux_Adv, and Offset fields based on an event type related to transmission of the extended advertisement message.

The server device transmits an extended advertisement message including an Aux_Adv_indication type advertisement PDU through a secondary physical advertising channel (1102). The secondary physical advertising channel may be channels #0 to #36.

A client device may receive the extended advertisement message based on the channel information. As shown in FIG. 11, the extended advertisement message transmitted on the secondary physical advertising channel may include synchronization information (syncinfo) and the like.

Next, the server device periodically transmits an extended advertisement message (1103). The extended advertisement message may include an Aux_Sync_indication type advertisement PDU or an Aux_Chain_Indication type advertisement PDU, and each PDU may include advertising data.

FIG. 12A shows examples of a PDU format of an advertisement message transmitted by a server device, and FIG. 12B is a diagram illustrating an example of transmission timing of an advertisement message.

As shown in FIG. 12A, an advertising channel PDU 1201 may include a 16-bit header field and a payload field as much as 1-255 octets.

In FIG. 12A, 1202 indicates an example of a payload field included in an extended advertisement message. The field may include a 6-bit extended header length field, a 2-bit AdvMode field indicating a mode in which an advertisement message is transmitted, an extended header field having a size of 0-63 octet, and an AdvData field having a size of 0-254 octets including audio data provided through an audio streaming service.

In FIG. 12A, 1203 indicates an extended header field included in a payload field of an extended advertisement message. The field includes an extended header flag having a 1 octet size, an AdvA field having a 6 octet size indicating the address of a device transmitting an advertisement message, a Target A field having a 6 octet size, an AdvDataInfo (ADI) field having a 2 octet size including information related to data, a Syncinfo field having a 18 octet size including synchronization information, a TxPower field having a 1 octet size indicating transmission power, and an ACAD field having various sizes including audio data.

In FIG. 12A, 1204 indicates an Aux Ptr field included in the extended header field of the extended advertisement message. The field may include a 6-bit channel index field, a 1-bit CA field, a 1-bit Offset Units field, a 13-bit AUX Offset field, and a 3-bit AUX PHY field.

In FIG. 12A, 1205 indicates a Syncinfo field included in the extended header field of the extended advertisement message. The fields may include a 13-bit Sync Packet Offset field, a 1-bit Offset Unit field, a 2-octet Interval field, a 37-bit ChM field, a 3-bit SCA field, a 4-bit AA field, a 3-octet CRCInit field, and a 2-octet Event Counter field.

Referring to 1206 of FIG. 12B, it can be seen that the server device periodically transmits an advertisement message including an ADV_EXT_IND type advertisement PDU with an offset of a predetermined value.

Referring to 1207 of FIG. 12B, it can be seen that the server device periodically transmits an advertisement message including an AUX_SYNC_IND type advertisement PDU for synchronization between the server device and the client device at an interval of a predetermined value.

Referring to 1208 of FIG. 12B, the server device transmits a periodic advertisement message. More specifically, (1) the server device first transmits an advertisement message including an ADV_EXT_IND type advertisement PDU.

Next, (2) the server device transmits an extended advertisement message including an AUX_ADV_IND type advertisement PDU.

Next, (3) the server device sequentially transmits one extended advertisement message including an AUX_SYNC_IND type advertisement PDU and two extended advertisement messages including an AUX_CHAIN_IND type advertisement PDU. The advertisement messages sequentially transmitted by the server device may be referred to as periodic advertisement message train. Next, the server device repeats the above steps (1) to (3). Here, a time interval between a time when the server device first transmits the extended advertisement message in step (3) and a time when the server device transmits the first extended advertisement message in step (3) repeatedly performed by the server device corresponds to a periodic advertisement interval. Hereinafter, for convenience of description, transmitting a specific type of PDU may refer to transmitting an advertisement message including a specific type of advertisement PDU. For example, transmitting the AUX_SYNC_IND PDU may refer to transmitting an extended advertisement message including an AUX_SYNC_IND type advertisement PDU.

FIG. 13 is a diagram illustrating an example in which audio data transmission is performed using Bluetooth low energy (BLE).

In FIG. 13, a server device 1310 for transmitting broadcast audio and a client device 1320 for receiving broadcast audio are shown. The client device may also be referred to as an acceptor.

The server device 1310 sequentially transmits an extended advertisement message including an ADV_EXT_IND type advertisement PDU including channel information of an extended advertisement message through periodic advertisement message transmission (Periodic Advertising), an extended advertisement message including an AUX_ADV_IND type advertisement PDU including synchronization information, etc, an extended advertisement message including an AUX_SYNC_IND type advertisement PDU including audio data and the server device 1310 may periodically perform the sequential transmission. (S1301, S1302).

The client device 1320 may obtain information related to synchronization by scanning the extended advertisement messages transmitted by the server device.

The client device 1320, which has obtained synchronization information, transmits a report that a synchronization signal has been received in a link layer of the client 1320 device to the host, and the host enables synchronization between the periodic advertisement message transmitted from the server device 1310 and the client device (S1303).

Thereafter, the client device 1320 receives audio data from the server device 1310 based on Broadcast Isochronous Group (BIG) INFO information included in the AUX_SYNC_IND type advertisement PDU (S1305 to S1310). A user of the client device 1320 may listen to audio based on the received audio data.

In FIG. 13, after the client device 1320 obtains synchronization information, it receives audio data without performing a separate filtering procedure. Accordingly, the client device 1320 may output an audible signal related to the received audio data as soon as it receives the audio data. Alternatively, when the client device 1320 is a device such as a smartphone equipped with a UI, the client device 1320 receives the audio data without performing a separate filtering procedure after obtaining synchronization information. Accordingly, as soon as the client device 1320 receives the audio data, it may output a list of devices that have transmitted the audio data to the user and allow the user to select the audio data. This may cause inconvenience, such as causing the device user to unnecessarily listen to an auditory signal.

FIG. 14 shows an example of an audio data transmission method using Bluetooth low energy.

More specifically, FIG. 14 shows a configuration procedure performed by a client device and a server device for transmitting and receiving Bluetooth audio data. An initiator may refer to a server device and an acceptor may refer to a client device.

In FIG. 14(a), the server device starts setting for a broadcast mode in an idle state (S1411).

Next, the server device sets a periodic advertisement mode (S1421). In this mode, the server device may send an advertisement message on a primary advertisement physical channel.

Next, the server device sets a periodic synchronization mode (S1431). In this mode, the server device may periodically transmit synchronization information on the secondary advertisement physical channel.

The server device completes the setting for transmitting the audio data by performing the steps S1411 to S1431 (S1441).

In FIG. 14(b), the client device starts an observation procedure in the idle state (S1412).

Next, the client device receives an extended advertisement message from the server device, and a link layer of the client device delivers an extended advertisement report event to an ASCP (S1422).

Next, the client device sets a periodic advertisement synchronization mode (S1431).

Next, the client device receives synchronization information transmitted in a periodic advertisement message from the server device in the periodic advertisement synchronization mode, and a link layer of the client device transmits a periodic advertisement report event to the ASCP (S1441).

The client device completes the setting for receiving audio data by performing steps S1412 to S1442 (S1452).

FIG. 15 shows an example of an audio data transmission method using Bluetooth low energy.

More specifically, FIG. 15 shows an enable procedure performed by a client device and a server device to transmit/receive Bluetooth audio data. An initiator may refer to a server device and an acceptor may refer to a client device.

In FIG. 15(a), the server device starts setting for the broadcast isochronous broadcasting mode (S1511). In this step, the server device may transmit broadcast isochronous stream (BIS) data of broadcast isochronous group (BIG).

Next, the server device sets the broadcast isochronous synchronization mode (S1521). In this step, the server device may periodically transmit broadcast isochronous synchronization information.

Thereafter, the ASCP of the server device enables audio (S1531). Enabling audio may refer to enabling transmission of audio data.

Next, the server device starts streaming audio data (S1541).

In FIG. 15(b), the client device sets a broadcast isochronous synchronization mode (S1512).

Next, the client device starts streaming audio data (S1522).

FIG. 16 shows an example of a method of transmitting audio data using Bluetooth low energy.

The server device transmits an extended advertisement message including an Aux_Ext_indication type advertisement PDU through a primary physical advertising channel (1601). The primary physical advertising channel may be channels #37 to #39, and the advertisement message may include channel information through which an extended advertisement message is transmitted. The extended advertisement message may include at least one of AdvA, ADI, Aux Ptr, ADId, Ch #_Aux_Adv, and Offset fields based on an event type related to transmission of the extended advertisement message.

The server device transmits an extended advertisement message including an Aux_Adv_indication type advertisement PDU through a secondary physical advertising channel (1602). The secondary physical advertising channel may be channels #0 to #36.

The client device may receive the extended advertisement message based on the channel information. As shown in FIG. 16, the extended advertisement message transmitted on the secondary physical advertising channel may include synchronization information (syncinfo) and the like.

Next, the server device periodically transmits the extended advertisement message (1603). The extended advertisement message may include an Aux_Sync_indication type advertisement PDU. The advertisement PDU may include at least one of Aux Ptr, ACAD, ADATA Ch #_Aux_chain, offset BIGInfo (ACAD), and Metadata (ADATA) fields, and may include advertising data (Advdata).

Thereafter, the server device may transmit a BIS data packet 1604 including audio data and a control packet 1606 including control information for providing an audio streaming service. The BIS data packet and the control packet may be periodically transmitted through an isochronous channel.

In order to transmit audio data using Bluetooth low energy, a periodic advertising sync transfer (PAST) method may be used.

The PAST method is a method applicable to a periodic advertisement transmission method. Through this method, when the server device provides synchronization information (SyncInfo) to the client device, the client device may obtain advertising data, while performing frequency hopping on a secondary channel without having to receive an Adv_Ext_Indication PDU and an Aux_Adv_Indication PDU.

The PAST method may also be applied to a method of transmitting audio data using Bluetooth low energy (broadcast audio). SyncInfo in the periodic advertisement transmission method may correspond to BIGInfo in broadcast audio. When the client device receives the BIGInfo information from the server device, the client device may receive audio data, while performing frequency hopping in the secondary channel without having to receive the Adv_Ext_Indication PDU, Aux_Adv_Indication PDU, and Aux_sync_Indication PDU.

When the PAST method is not applied, the server device delivers a general Announcement to the client device. The general announcement may be an advertisement message. Next, the client device parses BIGINFO in the general Announcement. Thereafter, the client device may receive broadcast audio data from the server device based on the parsed BIGINFO. Here, the client device may be a headphone or the like, and the server device may be a TV or the like.

When the PAST method is applied, as an example, the client device may receive BIG INFO related to audio data transmitted by the server device from a third device (commander). Here, the operation of the client device receiving the BIG INFO from the third device may be expressed as scan offloading.

More specifically, the third device receives a general announcement from the client device. The general announcement may be an advertisement message. Then, the third device establishes a connection with the client device. Thereafter, the third device transmits the BIGINFO of the server device to the client device. Here, the client device may be a headphone, etc., the server device may be a TV, etc., and the third device may be a smartphone or the like.

As another example, the client device may establish a connection with the server device and receive BIG INFO related to audio data transmitted by the server device directly from the server device.

More specifically, the client device delivers a general Announcement to the server device. The general announcement may be an advertisement message. Thereafter, the client device and the server device establish a connection. Thereafter, the server device delivers the BIGINFO of the server device to the client device.

FIG. 17 is a diagram illustrating an example of a method of transmitting audio data using Bluetooth low energy.

The server device 1410 broadcasts broadcast synchronization information to peripheral devices (1420). More specifically, the server device may sequentially transmit an Adv_Ext_Indication PDU, an Aux_Adv_Indication PDU, and an Aux_Sync_Indication PDU. The Aux_Sync_Indication PDU may include BIGINFO and Metadata. The BIGINFO may be the synchronization information for the client device to receive audio data.

Next, the server device periodically transmits broadcast audio data (1430). The broadcast audio data may be included in BIS_Data_Packet and transmitted. The client device may obtain the audio data based on timing information and frequency hopping algorithm information included in the BIGINFO.

FIG. 18 is a diagram illustrating an example of fields (octets) included in BIGINFO.

1 and 2 octets of BIGINFO corresponds to BIG offset, 3 to 14 octets corresponds to a BIG parameter, and 15 to 18 octets corresponds to SeedAccessAddress. Also, 19 to 20 octets correspond to BaseCRCInit, 21 to 25 octets correspond to SDU_config, and 26 to 30 octets correspond to bisPayloadCounter. Fields included in 1-30 octet may be necessarily included in BIGINFO. Finally, 31 to 54 octets correspond to BIG_Encryption, but this field is not necessarily included.

FIG. 19 is a diagram illustrating an example of a \BIG parameter field and an SDU_Config field showing an example of a specific field included in BIG synchronization information.

FIG. 19(*a*) shows an example of a BIG parameter field. The BIG parameter field may include Encryption (1 bit) field, two reserved for future use (RFU) (3 bits) field, ISO_Interval (12 bits) field, NumBIS (5 bits) field, Max_Payload_Size (1 octet) field and Sub_Interval (20 bits).

FIG. 19(*b*) shows an example of the BIG parameter (Cont) field. The BIG parameter (Cont) field may include a BIS_Spacing (20 bits) field indicating a BIS anchor interval, an NSE (5 bits) field, a BN (3 bits) field, a pretransmissionoffset (PTO) (4 bits) field, an ImmediateRepetitionCoun (IRC) (4 bits) field, and a PHYPHY (8 bits) field.

FIG. 19(*c*) shows an example of the SDU_Config parameter field. The SDU_Config parameter field may include an ISOAL_PDU_Type (1 bit) field indicating one of frame/unframed, an RFU (7 bits) field, and an SDU_Interval (20 bits) field indicating a Max_SDU_Size (12 bits) SDU_Interval (1 msec to 1.048575 sec).

Structure for Device Search Based on Voice Feedback in Server Device and Client Device FIG. 20 is a diagram illustrating an example in which a method proposed in the present disclosure is performed.

Specifically, FIG. 20 illustrates an example in which the method proposed in the present disclosure is performed between one server device and a client device. The server device may be a device in charge of audio transmission setting, and may be mainly a transmission device, a smartphone, a TV, or the like. The client device may be an audio transmission setting target device, and may mainly be a receiving device, a speaker, or an earphone.

The server device periodically transmits a BLE audio broadcast packet through the BLE Tx interface. The client device receives synchronization information sent from the server device.

Next, the client device determines a method for receiving audio data broadcasting. Thereafter, the client device receives information of audio data related to a specific program provided by the server device. Next, the client device outputs audio data to the user, and when an input to listen to the broadcast from the user is obtained, the client device receives and decodes an audio data broadcast stream. In this case, the user's input may be pressing a button mounted on the client device, nodding, or the like.

FIG. 21 is a diagram illustrating an example in which a method proposed in the present disclosure is performed.

Specifically, FIG. 21 shows an example in which a method proposed in the present disclosure is performed between one (i) server device and (ii) a client device and a user assistance device that assists the method to be performed between the client device.

According to FIG. 21, in order to reduce signaling overhead of the client device, scanning of an advertisement packet may be performed in the user assistance device. The user assistance device may be a smartphone or the like.

The user assistance device synchronization information from the server device and transmits the synchronization information to the client device so that the client device may receive broadcasting data sent from the server device.

The client device receiving the synchronization information from the user assistance device directly receives and decodes audio data broadcast information from the server device.

As another example, the client device and the user assistance device are connected in the same manner as in the existing wireless connection method so that decoding is performed in the user assistance device, and the user assistance device may be connected to the client device by unicast and send data to the client device.

Method of Providing Audio Data Information

The present method relates to a method of providing information on audio data of a specific program provided by a server device. The information on the audio data of the specific program may be expressed as audio data information or program information, and may be referred to as various expressions that may be interpreted similarly.

Information on the audio data of the specific program may be included in an extended advertisement message including an Aux_Sync_Indication type advertisement PDU and transmitted. More specifically, the audio data of the specific program may be included in a meta data field of an Aux_Sync_Indication type advertisement PDU. For convenience of explanation, hereinafter, audio data of the specific program may be expressed as broadcast audio, and information on audio data may be expressed by audio data information, program information, or terms that may be interpreted similarly.

Hereinafter, a method of including the audio data information in metadata will be described.

(Proposal 1) Method of Including Program Title in Text Format in Metadata

This proposal relates to a method of including audio data information in the form of a TV program (or channel) title in the metadata field.

Meta data for a BIG stream including audio data is included in a meta data field of an Aux_Sync_Indication PDU. The metadata field may be defined in a higher layer profile. The metadata field may be located in the AdvData field of the Aux_Sync_Indication PDU, and may have a size of 0 to 254 octets.

The user may determine whether to listen to audio data related to a specific program provided by the server device based on the metadata field included in the Aux_Sync_Indication PDU.

That is, when the client device receives BT broadcast synchronization information (Broadcast Sync information), the client device may output audio data information included in the metadata field included in the synchronization information to the user. The user may determine whether to listen to audio data for the specific program provided by the server device based on the output audio data information. In order to determine whether to listen to the audio data, the user may perform a specific input to the client device. For example, the input may be pressing a button of a smartphone or headphones or moving the headphones up and down.

Since Aux_Sync_Indication is a unit corresponding to broadcast isochronous group (BIG), the BIG range may be regarded as a program. For example, when the server device transmits a specific program (broadcast) through BT Broadcast, the client device may obtain audio data information from PSIP (Program Specific Information Protocol) information. In this case, when there is no PSIP information in a specific program provided by the server device, the server device may directly set a program title.

(Proposal 2) Method of Including Multi-Language Stream in Metadata

This proposal relates to a method of including audio data information in the meta data field in the form of a multi-language stream.

More specifically, a multi-language stream may be included in one broadcast Isochronous Group (BIG). In this case, a language code of each stream may be informed so that the client device may receive and decode only a stream of a specific language when receiving audio data information. When the multi-language stream is included, Multi-Language_Information may be added to BIG_Description.

The metadata field may include a UUID_Multi_Language_Information (16 bit) field, a length (8 bit) field, and a value (254—BIG_Description) field in order. The BISs included in the Value field may include a language-code in order from a BIS stream #0. For example, the BIS stream #0 may be English, a BIS stream #1 may be Korean, and a BIS stream #2 may be French. In this case, the Length field may be input as 9 bytes (3×3 bytes), and the Value field may be input as ENG, KOR, or FRE.

In addition, the multi-language stream may be transmitted on a multi-channel. The Value field may include language and channel values in order from stream #0 of BIS. For example, Channel(location) may be an enumeration type. That is, it may be 0: mono, 1: left, 2: right, 3: center, 4: rear left, 5: rear right, and 6: base woofer. Here, BIS #0 stream: English-Left stereo, BIS #1 stream: English-Right stereo, BIS #2 stream: Korean mono, BIS #3 stream: French mono, the Length field has a 12-byte (4×3 byte) size, and ENG1, ENG2, KOR0, and FRE0 may be input in the Value field.

(Proposal 3) Method of Including Audio Data Information in Metadata in the Form of Audio Stream This proposal relates to a method of including audio data information in an audio stream format in a metadata field instead of including audio data information in text format. Here, the audio data information may be a program title of a specific program provided by the server device. When audio data information is included in the metadata in the form of text, the user should perform a procedure for selecting audio data using a device equipped with a UI. Meanwhile, when the audio data information is included in the metadata in the form of an audio stream, the client device may check the audio data information and output it directly to the user, so that the user may easily determine whether to receive the audio data.

For convenience of implementation, a BIS stream through which audio data information in the form of an audio stream is transmitted may be limited to the BIS #0 stream. Program title audio (PTA), which is not used for multi-language codes, may be used as a 3-byte character.

Audio data information in a text format may be converted into audio data information in an audio stream format by a third device such as a server device or a smartphone through a text to speech (TTS) technique. The converted audio data information may be provided to the client device. Also, when a specific program provided by the server device does not provide a program title, audio data information in the form of an audio stream may be generated by uploading arbitrary audio. The generated audio data information in the form of an audio stream may be a short audio stream of about 2 to 3 seconds. Background music/effect, as well as voice, may be added to the audio data information.

The metadata field may include a UUID_Multi_Language_Information (16 bit) field, a length (8 bit) field, and a value (254—BIG_Description) field in order.

The BIS included in the Value field may include a language-code in order from the BIS stream 0. As an example, it may be BIS #0 stream: Program title audio, BIS #1 stream: English, BIS #2 stream: Korean, and BIS #3 stream: French. In this case, the Length field may have a size of 12 bytes, and PTA, ENG, KOR, and FRE may be input into the Value field.

Server Device Search Based on Audio Data Information

FIG. 22 is a diagram illustrating an example in which an audio data transmission method based on audio data information proposed in the present disclosure is performed.

Specifically, FIG. 22 illustrates a process in which the client device receives audio data transmitted by the server device.

The server device broadcasts synchronization information (2210). The synchronization information may be included in an extended advertisement message and transmitted. More specifically, in order to transmit the synchronization information, the server device may sequentially transmit an Aux_Ext_Indication PDU and an Aux_Adv_Indication PDU. 'The server device sequentially transmits the Aux_Ext_Indication PDU and the Aux_Adv_Indication PDU' may mean that 'the server device transmits synchronization information'.

When the server device broadcasts the synchronization information, the server device may transmit indication information indicating that the audio data information is included together with the audio data in the broadcast audio data to the client device. The indication information indicating that the audio data information is included in the broadcast audio data together with audio data may be included in a BIG INFO field included in an Aux_Sync_Indication type advertisement PDU.

The audio data information may be information on audio data of a specific program provided by the server device. The client device receives the audio data information (2220). Thereafter, the client device may decode and output the audio data information in order for the user to know which program is provided by the server device (2231 to 2233). Also, the audio data information may be output in the form of (i) voice or (ii) a mixture of voice and additional sound effects. Since the user did not input information indicating that audio data was received before 2233 of FIG. 22, the client device transmits only audio data information included in broadcast audio data and audio data information among audio data to a host of the client device. That is, the audio data is not delivered to the host.

In 2233 of FIG. 22, the user inputs information indicating that audio data is received based on the output audio data information (2240).

When the client device obtains an input from the user, if the user's input indicates that the audio data is received, the client device receives the audio data transmitted by the server device and delivers the audio data to the host (2250). In this case, audio data information may not be transmitted to the host after a point in time when an input indicating that audio data is received from the user is obtained.

Conversely, if the user does not perform an input within a specific timeout time, the client device returns to an initial state. The initial state may refer to an operating state of the client device before receiving an extended advertisement message for providing an audio streaming service from the server device.

Also, although the client device has obtained an input from the user that it does not receive audio data transmitted by the server device, the user may want to receive the audio data afterwards. In this case, the client device may scan whether signal strength of the server device is measured to be a strength greater than or equal to a specific threshold value. The measurement of the signal strength may be performed by measuring signal strength of the Aux_Ext packet of the minimum primary channel. When the signal strength is greater than or equal to a specific threshold, the client device parses the Aux_Ext packet in an observation procedure, and transmits a determined extended advertising report event to the host.

The BIG including the audio data and audio data information may be referred to as broadcast audio data. Since the audio data and the audio data information are data transmitted by the same server device, one group ID (Broadcast Isochronous Group: BIG) may be assigned. In addition, each of the data may be represented by a sub ID (Broadcast Isochronous Stream: BIS). That is, BIG=TV program description, BIS1=audio data information, BIS2=audio data. The BIG may be an identifier assigned to the broadcast audio data.

FIG. 23 is a diagram illustrating an example of a method in which a server device transmits audio data and audio data information.

Specifically, FIG. 23 shows examples of multiplexing methods when the server device transmits audio data information and audio data bundled in BIG.

Since audio data information and audio data are transmitted from one server device, they may be included in the same audio group. Accordingly, the audio data and audio data information may be included in one BIG, but the audio data and audio data information may be respectively included in different BISs included in the BIG and transmitted, respectively. Broadcast audio data bundled into one data group and transmitted may be transmitted on the same isochronous channel. Grouping different data into one group may be expressed as grouping different data.

More specifically, when a state of the client device is Broadcast Stream—Configure procedure, the client device may decode only BIS1 including audio data information among BIS1 and BIS2 included in the received BIG. That is, since the client device does not obtain input information indicating that it receives audio data transmitted by the server device from the user, if the client device decodes even the audio data included in BIS2, unnecessary resource waste and power consumption are induced.

Meanwhile, when the client device obtains input information indicating that it receives audio data transmitted by the server device from the user, the state of the client device is changed from Broadcast Stream—Configure procedure to Broadcast Stream-Enable procedure. Thereafter, the client device may decode both BIS1 and BIS2 included in the received BIG.

In order to perform the above operation, an indicator flag indicating whether the BIS1 includes audio data information may be included in the synchronization information. The indicator flag may also be expressed as indication information. The client device may selectively decode audio data information and audio data included in broadcast audio data transmitted by the server device based on the indicator flag.

Referring back to FIG. 23, the server device may sequentially include audio data information and audio data in the BIG (2310). That is, data may be included in the BIG in the order of BIS1→BIS1→BIS2→BIS2.

Second, the server device may alternately include (interleave) audio data information and audio data in the BIG (2320). That is, data may be included in the BIG in the order of BIS1→BIS2→BIS3→BIS4.

FIG. 24 is a diagram illustrating an example of a method in which a server device transmits audio data and audio data information.

Specifically, FIG. 24 shows an example in which the server device transmits audio data information to the client device by including it in Aux_adv_indication. That is, the server device includes the audio data information in the Aux_adv_indication PDU and the audio data in the Aux_Sync_indication PDU or Aux_Chain_indication PDU. Next, the server device may sequentially transmit the (i) Aux_adv_indication PDU and (ii) Aux_Sync_indication PDU or Aux_Chain_indication PDU. Here, the Aux_adv_indication PDU may be transmitted on a primary physical advertising channel, and the Aux_Sync_indication PDU or Aux_Chain_indication PDU may be transmitted on a secondary physical advertising channel.

The audio data information may be included in the ADATA field included in the Aux_Adv_Indication packet. If a storage space of the ADATA field is not sufficient to include the audio data information, remaining data of the audio data information may be included in a next transmitted Aux_Chain_indication packet.

In addition, in order for the client device to correctly decode the audio feedback information, the server device may include an indicator flag indicating that the Aux_Adv_Indication PDU includes audio data information in the Aux_Adv_Indication PDU. The client device may recognize that audio data information is included in the Aux_Adv_Indication PDU based on the indicator flag.

Thereafter, the client device may decode audio data information included in the ADATA field of the Aux_Adv_Indication packet and output (play) the decoded audio data information.

The client device should perform Aux_Sync_Indication PDU processing thereafter. Accordingly, in order to minimize the influence on the processing of the Aux_Sync_Indication PDU of the client device, the output audio data information may be set to a short time length of several seconds.

The user may listen to voice data information output by the client device and input information indicating that audio data is received. In this case, a state of the client device is changed from the Broadcast Streaming—Configuration procedure state to a Broadcast Streaming—Enable procedure state.

Thereafter, the client device receives and decodes audio data included in Aux_Sync_indication (and subsequent Aux_Chain_Indication).

FIG. 25 is a diagram illustrating an example in which an audio data transmission method based on audio data information proposed in the present disclosure is performed.

Specifically, FIG. 25 shows an example of a process in which a client device receives audio data transmitted by a plurality of server devices.

When multiple server devices transmit broadcast audio data, the client device searches for a plurality of broadcast audio data transmitted by multiple server devices.

In this case, first, when the user selects only one audio data among audio data transmitted by a plurality of server devices, the client device may output audio data information corresponding to the plurality of received audio data at time points different from each other.

The user inputs information indicating that specific audio data is to be received among audio data information output at different time points. Thereafter, the user may listen to the selected audio data.

Second, the user may not select any audio data among audio data transmitted by the plurality of server devices. In this case, the client device may limit the number of repeated outputting of audio data information related to each audio data. The number of repeated output may be limited to about 3 to 5 times, and if no information is input while a voice feedback is repeated, the voice feedback may no longer be output.

Finally, the user may wish to re-listen to the audio data of the server device that he did not wish to listen to. In this case, the client device may continuously monitor the signal strength of the advertising packet AUX_EXT of the primary channel. When the client device determines that the server device is located close to the client device, the client device may receive synchronization information and output audio data information.

Method of Setting Unique Voice Feedback in Server Device

FIGS. 26 and 27 are diagrams illustrating an example of a method for a client device to set audio data information to a server device.

When a specific program provided by the server device changes in real time, if audio data information that does not reflect a change in the program is repeatedly output, it may be difficult for the user to recognize that the audio data transmitted by the server device has changed.

Accordingly, when a program provided by the server device is changed, it is necessary to change audio data information for audio data of the program. In order to change the audio data information set in the server device, a method of configuring an upload GATT Service and changing the audio feedback information stored in the server device using the GATT service.

Specifically, the GATT client (client device) receives an advertisement packet from the GATT server (server device) (S2610), the GATT client forms a connection with the GATT server (S2620).

Next, the GATT client transmits a read request message to the server device to request reading of status information of the audio data information stored in the status characteristic of the GATT Server to the GATT server, and then, the GATT client receives a read response message including the status information from the server device (S2630).

As shown in FIG. 27, the status information may include at least one of name information of the audio data, date information in which the audio data information is stored in the first specific characteristic, or version information of the audio data information.

Next, the GATT client transmits a write request message to request writing of a characteristic value related to the changed audio feedback information to a second specific characteristic of the service device to change the audio feedback information based on the status information (S2640).

The write request message may include some data among data constituting the changed audio feedback information.

Although not shown in FIG. 26, the GATT client may receive a write response message from the GATT server in response to the write request message.

Here, the GATT client transmits new audio feedback information to the GATT server through the data characteristic as a binary file encoded with the Bluetooth recommended codec.

A size of the characteristic MTU is about 21 to 255 bytes, and it may be difficult for the file to be transmitted with one characteristic write. Therefore, it may be transmitted by characteristic write over a plurality of times, and to this end, a sequence number is applied to a header of each of a plurality of data constituting the audio feedback information and transmitted.

FIGS. 28 and 29 are diagrams illustrating an example of a method in which a management server device provides synchronization information of server devices to a client device.

The management server device may receive synchronization information from each of the surrounding server devices (Broadcast Advertiser). The management server device may transmit the received broadcast synchronization information of nearby server devices to another broadcast scanner device (client device). In this manner, a burden of the client device performing scanning multiple times in order to synchronize with the plurality of server devices may be reduced. This method may be expressed as "Scan Offloading".

When a plurality of server devices are BLE audio broadcasting, the client device may receive audio data information from each server device. However, rather than this method, usability of the client device may be improved when the management server device transmits audio feedback information of all server devices to the client device at once. The management server device may use a BLE periodic advertising sync transfer (PAST) technology to deliver synchronization information of all server devices to the client device.

As shown in FIG. 28, the entire synchronization information including synchronization information of all server devices that the management server device transmits to the client device may be transmitted through a separate broadcast channel for transmitting voice data.

In FIG. 29, the client device receives the entire synchronization information from the management server through a separate broadcast channel (S2910).

Next, the client device receives audio data from surrounding server devices based on the entire synchronization information (S2920).

Additionally, Bluetooth bonding means that an encryption key used for pairing between a central (master) device and a peripheral (slave) device is stored (cached) on both sides, making it convenient when connecting later.

Audio feedback information may be considered as data to be frequently used in the BLE audio broadcasting environment and may be stored in advance. Even if there is only one server device, audio feedback information may be stored (cached) for later use in an environment where the information is frequently received.

FIG. 30 shows examples in which a method for receiving audio data using the Bluetooth technology proposed in the present disclosure is performed.

FIG. 30(*a*) corresponds to an example in which a plurality of client devices receive broadcast audio data transmitted by one server device. The method may be applied even when a plurality of client devices receive broadcast audio data transmitted by one server device as described above.

FIG. 30(*b*) corresponds to an example in which a plurality of client devices receive broadcast audio data transmitted by a plurality of server devices. The method may be applied even when a plurality of client devices receive broadcast audio data transmitted by a plurality of server devices as described above.

FIG. 31 shows an example in which a method of receiving audio data using the Bluetooth technology proposed in the present disclosure is performed.

More specifically, FIG. 31 relates to a case in which a server device receives broadcast audio data being broadcast by a TV (server device) installed in an airport.

Here, audio data information, information on audio data being broadcast by the server device, may be transmitted in various languages.

Additionally, a desired language may be preset in the client device, and in this case, the client device may receive only audio data information generated in the same language as the set language.

FIG. 32 is a diagram illustrating an example of an operation implemented in a client device for receiving audio data using the Bluetooth technology proposed in the present disclosure.

More specifically, in the method for receiving audio data using a Bluetooth low energy technology, performed by the client device, the client device receives, from the server device, a first advertisement message including information for providing an audio streaming service (S3210).

Next, the client device receives, from the server device, a second advertisement message including synchronization information for synchronization between the client device and the server device (S3220).

Here, the synchronization information may include timing information of the broadcast audio data and frequency hopping information for reception of the audio data.

The client device receives, from the server device, a third advertisement message including an indicator representing that the audio data of the audio streaming service is grouped with audio data information for the audio data and transmitted (S3230).

Next, the client device receives, from the server device, broadcast audio data including the grouped audio data and the audio data information based on the indicator through an isochronous channel (S3240).

Here, a grouping ID (identifier) for identifying the broadcast audio data may be assigned to the broadcast audio data, an audio data ID for identifying the audio data may be assigned to the audio data, and audio data ID for identifying the audio data information may be assigned to the audio data information.

Also, the audio data and the audio data information may be interleaved so as to be grouped.

Also, the audio data may be audio data related to a specific program provided by the server device, and the audio data information may indicate a title of the specific program.

Thereafter, the client device obtains, from the user, specific information related to whether to permit a provision of an audio streaming service based on the audio data information (S3250).

Finally, when the specific information represents permission to provide the audio data, the client device decodes the audio data (S3260).

Additionally, the client device may decode the audio data information. Here, only the audio data information among the audio data and the audio data information may be decoded before the specific information is obtained from the user.

Also, the client device may output the decoded audio data information.

Additionally, the client device may form a connection with the server device and send a read request message requesting to read the state information of the audio data information stored in a first specific characteristic of the server device to the server device.

Here, the state information may include at least one of name information of the audio data, date information at which the audio data is stored in the first specific characteristic, and version information of the audio data.

Then, the client device may receive a read response message including the status information from the server device.

Additionally, the client device may transmit a write request message requesting writing of a characteristic value related to the changed audio data information in a second specific characteristic of the server device to change the audio data information based on the state information, to the server device. Here, the write request message may include some data among data constituting the changed audio data information.

Thereafter, the client device may receive a write response message from the server device in response to the write request message.

Here, each of the write request messages may include sequence number information for the some data.

Additionally, the client device may receive full synchronization information related to synchronization between the plurality of server devices and the client device from a management server that manages a plurality of server devices including the server device.

Here, the entire synchronization information may include synchronization information for each of the plurality of server devices.

Here, synchronization information for each of the plurality of server devices may be previously stored in the management server.

Additionally, the client device may measure the received signal strength of the first advertisement message.

In this case, when the received signal strength of the first advertisement message is greater than or equal to a specific threshold value, the client device may decode the first advertisement message.

Broadcast TV Profile

The broadcast TV profile provides metadata and a procedure for a broadcast TV initiator and acceptor. This profile is based on ASCP and defines broadcast metadata when the initiator announces itself to a nearby acceptor. The initiator may be a server device, and the acceptor may be a client device.

FIG. 33 is a diagram illustrating a hierarchical structure of a broadcast profile.

Based on ASCP, broadcast TV as an initiator may transmit data and the like in a broadcast manner. Acceptors, which are external devices, may receive the data and communicate with the initiator in a unicast manner Bluetooth Specification Release Compatibility The broadcast TV profile is compatible with a Milan version of the Bluetooth standard that supports isochronous channels.

In a broadcast TV profile, when a field of a protocol data unit (PDU) or other data structure is marked as 'Reserved for Future Use', the field value is set to 0 unless otherwise specified. In addition, unless there is a separate explanation regarding the corresponding field, the field may not be ignored or interpreted by a device receiving the corresponding field.

If the field value is enumeration, an unassigned value may be marked as "Prohibited". Such a value is not used by implementation, and a received message containing the value indicating Prohibited may be ignored and not processed, and a device receiving the message should not respond thereto.

If a field, parameter, or other variable object may have a range of values and some of the values indicate "prohibited", the device should not set an object with the prohibited values. A device that receives an object with such a value should reject it, and any data structures containing it should be considered invalid.

FIG. 34 illustrates a relationship between a broadcast TV initiator and a broadcast TV acceptor.

In FIG. 34, two roles of a broadcast TV initiator and a broadcast TV acceptor are defined.

A broadcast TV initiator refers to a device that broadcasts program information metadata.

The broadcast TV acceptor refers to a device that scans program information metadata through periodic advertising and uses the scanned data to receive broadcast streams.

The broadcast TV Initiator may be a broadcaster, (core specification Vol3, Part C, GAP, 2.2.2.1), the broadcast TV Acceptor may be an observer. (core specification Vol3, Part C, GAP, 2.2.2.2)

A topology of the broadcast TV profile may be applied only to LE audio broadcast. Furthermore, there are no concurrency restrictions or restrictions on the broadcast TV Initiator or broadcast TV acceptors imposed by the above profile.

User Scenarios

TVs are available in many public places, including gyms, buses, shops, airports, and cafeterias. TVs in public places are usually provided in a muted state. Accordingly, the user may listen to audio data related to a program to be viewed through the LE audio broadcast provided in this profile.

LE audio broadcast scenarios are outlined in HA and HQA FRD.

In order for the user to easily search for a TV that the user is interested in, information on a broadcast program for identifying a program broadcast on the TV may be required. That is, audio data information related to audio of a broadcast program may be required.

Using this information, the user may identify the broadcast program by the acceptor, such as a smartphone, headphones or speaker. Thus, the acceptor may eventually inform the user of available programs in the LE audio broadcast. A scenario to which a broadcast TV audio profile is applied may be applied to a public scenario in which the user may receive only a notification about a TV program. That is, in a scenario where the broadcast TV audio profile is applied, the user cannot generally change the channel. Therefore, in a scenario in which the user may remotely change a channel being provided on a TV, it may be difficult to apply a broadcast TV audio profile.

FIG. 35 shows an example of a scenario to which a broadcast TV audio profile may be applied.

In the case of LE audio broadcast, an initiator 3510 broadcasts a signal and data. Here, the initiator may be a TV or the like.

The signal may be periodic information (BigInfo) for tuning a program and a program description (Program Info). The data may be actual audio data carrying audio associated with a TV program.

In FIG. 35(*a*), an interaction between the acceptor and the user occurs in the acceptor 3520. That is, the user may browse a TV program by looking at a display of the acceptor. The acceptor may be a smartphone. The user may listen to audio data received by the acceptor through a headset 3530 connected to the acceptor by wire.

As shown in FIG. 35(*b*), the existing acceptor only displays a list of searched initiators but does not display information on programs that each initiator is broadcasting. That is, the existing acceptor displays only the name of the searched initiator (e.g., LG-TV or Sony-TV, etc.) to the user. When there is only one initiator, it does not cause inconvenience to the user, but when there are a plurality of initiators, it may be difficult for the user to listen to audio data that the user wants to listen to.

By applying the LE audio broadcast profile, the acceptor may inform the user of information on a program that the Initiator is broadcasting to the user, based on program information metadata. For example, if the acceptor is a smartphone, a program currently being broadcast may be displayed to the user through a UI of the smartphone. If the acceptor is a device without a UI, program information may be informed to the user through a method of outputting a voice or the like. Accordingly, the user may easily find a TV broadcasting a program that the user wants to watch. Also, even if there is only one TV serving as an initiator, it is natural that program information of the TV may be usefully used by the user. In addition, if the acceptor outputs audio data immediately after synchronization with the initiator without the user's opportunity to select whether to receive program-related audio data, the user may experience inconvenience by listening to unwanted audio data.

FIG. 36 shows an example in which an initiator notifies a user of information on a broadcast program based on program information.

In FIG. 36, when the program "ESPN Sports-Baseball LA dodgers vs. New-York Yankees" is currently being broadcast by the initiator, information on the program may be provided from the initiator. Information on programs may be automatically extracted from EPG data of existing TV service providers. Also, when the initiator is playing a program for which program information is not set, the program information may be manually set by the TV user.

FIG. 37 shows another example of a scenario to which a broadcast TV audio profile may be applied.

In the case of LE audio broadcast, an initiator 3710 broadcasts a signal and data. Here, the initiator may be a TV or the like.

In FIG. 37, in a headphone 3730, an interaction between the headphone and the user occurs. The user may listen to program information through the headphone 3730.

Broadcast TV Scenario Device Setting

FIG. 38 shows various examples of a broadcast TV scenario device setting method.

In FIG. 38, the user should search for a TV App or navigate a menu and select a TV program through a smartphone. The smartphone may be equipped with an existing display and touch UI interface.

The user may hear the voice (or sound) through the headphones. The user may listen to main audio data for a program by clicking program information displayed on the display of the smartphone or clicking a button mounted on the headphone. Here, the headphone may include a click button or a motion sensor for detecting a user turning off audio data for a specific program. Headphones may conceptually be equivalent to one or two earphones, a neckband or earbuds.

In FIG. 38(a), the smartphone is connected to the headphone by wire. LE broadcast may be applied between the TV and the smartphone, which are the initiators. The TV may transmit BigInfo and Program Info and actual audio data carrying audio related to the TV program the TV is broadcasting to the headphone.

In FIG. 38(b), the smartphone is wirelessly connected to the headphone through BR/EDR or LE unicast. LE broadcast may be applied between the TV and the smartphone, which are the initiators. The TV may send BigInfo and Program Info and actual audio data carrying audio related to a TV program the TV is broadcasting to the headphone.

In FIG. 38(c), the smartphone receives BigInfo and Program Info from the TV, and transmits synchronization information to the headphone through periodic advertising sync transfer (PAST). This method may be called scan offloading. The headphone may receive data from the TV using the synchronization information.

In FIG. 38(d), the headphone may receive LE broadcast data directly from the TV.

FIG. 39 shows an example of a data field configuration included in an extended advertisement PDU.

FIG. 39(a) shows an example of an extended header field included in a payload field of an extended advertisement PDU. The field includes an extended header flag having a 1 octet size, an AdvA field having a 6 octet size indicating an address of a device transmitting an advertisement message, a Target A field having a 6 octet size, an AdvDataInfo (ADI) field having a 2 octet size including data related information, a Syncinfo field having a 18 octet size including synchronization information, a TxPower field having a 1 octet size indicating transmission power, and an ACAD field having various sizes including audio data.

FIG. 39(b) shows an example of a payload field included in an extended advertisement message. The field may include a 6-bit extended header length field, a 2-bit AdvMode field indicating a mode in which an advertisement message is transmitted, an extended header field having a size of 0 to 63 octets, and an AdvData field having a size of 0 to 254 octets including audio data provided through an audio streaming service.

FIG. 40 shows an example of a data field configuration included in AUX_SYN_IND_PDU.

AUX_SYN_IND_PDU includes AdvA, Target A, CTE info fields, etc. and, in FIG. 40, O indicates optional inclusion and X indicates reserved for future use.

Broadcast TV Initiator Role Requirements

The broadcast TV Initiator periodically performs broadcast audio announcement. In the broadcast audio announcement, there is metadata for obtaining timing information for tuning a channel, and there is also program information metadata for describing a TV program itself.

Timing information is located in an ACAD field of BIGINFO, and program information is located in an AdvData field like ProgramInfo in an AUX_SYNC_IND packet.

The program information may be information recognizable by a person currently broadcasting a TV.

For example, when the TV plays a conventional program such as sports broadcast, weather forecast, or news, the program information may be a title of a broadcast program. When the TV is playing a commercial message in a department store, the program information may be a commercial message notification. If the TV plays flight arrival/departure information at the airport, the information may be for an airport notification.

FIGS. 39 and 40 illustrate a location of program information meta data.

There are two separate metadata fields in the AUX_SYNC_IND packet. ACAD is defined by a core specification and retains BIGInfo used for timing of broadcast streams, and AdvData retains ProgramInfo defined here and used to describe broadcast streams.

A length of BIGInfo is 33 octets for unencrypted BIG and 57 octets for encrypted BIG. Since the AUX_SYNC_IND packet size is 254, AdvData's ProgramInfo may occupy 254−(33+4) for the unencrypted BIG.

FIG. 41 shows an example of a BLE broadcast audio operation.

The server device transmits an extended advertisement message including an Aux_Ext_indication type advertisement PDU through a primary physical advertising channel. The primary physical advertising channel may be channels #37 to #39, and the advertisement message may include channel information through which an extended advertisement message is transmitted. The extended advertisement message may include at least one of AdvA, ADI, Aux Ptr, ADId, Ch #_Aux_Adv, and Offset fields based on an event type related to transmission of the extended advertisement message.

The server device transmits an extended advertisement message including an Aux_Adv_indication type advertisement PDU through a secondary physical advertising channel. The secondary physical advertising channel may be channels #0 to #36.

As shown in FIG. 41, the extended advertisement message transmitted on the secondary physical advertising channel may include synchronization information (syncinfo) and the like.

Next, the server device periodically transmits the extended advertisement message. The extended advertisement message may include an Aux_Sync_indication type advertisement PDU. The advertisement PDU may include at least one of Aux Ptr, ACAD, ADATA Ch #_Aux_chain, offset BIGInfo (ACAD), and Metadata (ADATA) fields, and may include an advertising data (Advdata) field. The advertising data field may include program information (programinfo).

Thereafter, the server device may transmit a BIS data packet including audio data and a control packet including control information for providing an audio streaming service. The BIS data packet and the control packet may be periodically transmitted through an isochronous channel.

The user may determine whether to receive audio data included in the BIS data packet based on the program information.

Programinfo Text Metadata

Most TVs receive electronic program guide (EPG) data from terrestrial, cable, satellite or IP broadcasting to draw an EPG UI (see ATSC A/65, DVB SI (ETSI EN 300 468)).

Here, the ProgramInfo metadata used in the TV broadcast profile may be current program information extracted from EPG data. When the current program is changed, ProgramInfo may be changed accordingly. Text metadata may mainly be decoded in a smartphone that may use an on-screen UI.

The table below shows an example of Programinfo metadata.

TABLE 2

| Type (Name) | Length (Octet) | Value (Description) |
| --- | --- | --- |
| ProgramInfo Metadata UUID | 2 | UUID by Bluetooth SIG |
| ProgramInfo Metadata Length | 2 | Metadata Length from Language Count to ProgramInfo Text (in Octet) |
| Language Count | 1 | Multi language repetition count from ISO_639_language_code to ProgramInfo |
| ISO_639_langauge_code | 3 | 3 byte language code (KOR, ENG, FRE . . . ) |
| Character Set | ? | Program Information Character Code Set |
| ProgramInfo Length | 2 | Program Information Text Length (in Octet) |
| ProgramInfo | Variable | Program Information Text |

In case of supporting multiple languages, it is repeated in ProgramInfo text in ISO_639_Language_code is according to Language count.

Options for setting the character set here are as follows.

Option1> BT uses 5 bits of allocation number enumeration but extends if UTF-8 does not exist.

Option2> uses the entire string like "ISO-8859-1". This option takes up a lot of space.

Option3> allows only 2 sets. In the case of western languages, different languages are used in the case of ISO-8859-1 and UTF-8.

ProgramInfo Audio Metadata

In scenario B, where a smartphone and headphones are connected by wire, a user may listen to audio (or sound) program information on the headphones, and may directly select a TV program by clicking a button or turning off the head.

All UI actions occur in headphones where on-screen UI is not available. As headphone UIs for selecting multiple languages are limited, only one most preferred language program information is recommended.

Two approaches may be used to provide audio program information to a user.

First, audio information may be prepared in an acceptor by text-to-speech (TTS) using text information. TTS conversion using ProgramInfo text may be performed in a smartphone, or if a headphone has performance sufficient to create TTS, the headphone may generate a TTS audio sound by itself.

Second, audio information is prepared in the Initiator by TTS using text information or its own audio creation mechanism.

A TV may perform TTS and transmit audio using ProgramInfo Text. Background sounds/effects may also be mixed with TTS sounds. Alternatively, own program information audio may be created. For easy decoding IN headphones, the ProgramInfo audio metadata BIS may be a first BIS (BIS number 1) in the BIG.

For a two-piece (left and right) ear bud, it may be advantageous for one BIS to carry the left and right channels in the Broadcast TV Initiator for simple implementation. Each earbud tuned by BIS may extract an individual channel.

In general, TV audio output is simple Mono, and the right channel may be a copy of an audio of a left channel. Taking this into consideration, a broadcast TV Initiator may only send one left channel, while a broadcast TV acceptor (for two-piece earbuds) may copy the left channel to make a right channel.

BIG=TV Program Audio with ProgramInfo Metadata Audio

BIS number 1=ProgramInfo Metadata Audio

BIS number 2=TV Program Audio

Multilingual Audio Stream

A TV program audio provided with a TV program video may be multilingual. In this case, the BIS order of the BIG should follow a repetition order of the ProgramInfo Text metadata.

For example, the programInfo text sequence of the multilingual part may be as follows.

ENG(Iso_639_languagecode)+ProgramInfo Length+ProgramInfo

KOR(Iso_639_Languagecode)+ProgramInfo Length+ProgramInfo

FRE(Iso_639_Languagecode)+ProgramInfo Length+ProgramInfo

If there is ProgramInfo metadata audio, the audio is inserted into the first BIS number. The BIS order of BIG may follow the ProgramInfo Text order.

BIS number 1=ProgramInfo Metadata Audio

BIS number 2=TV Program Audio ENG

BIS number 3=TV Program Audio KOR

BIS number 4=TV Program Audio FRE

Broadcast TV Acceptor Role Requirements

Unlike the Broadcast TV Initiator, the broadcast TV Acceptor may stop scanning after a certain period of time or always perform scanning.

The aforementioned embodiments are achieved by combination of structural elements and features of the present disclosure in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

An embodiment of the present disclosure may be implemented by various means, for example, hardware, firmware, software or a combination of them. In the case of implementations by hardware, an embodiment of the present disclosure may be implemented using one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers and/or microprocessors.

In the case of implementations by firmware or software, an embodiment of the present disclosure may be implemented in the form of a module, procedure, or function for performing the aforementioned functions or operations. Software code may be stored in the memory and driven by the processor. The memory may be placed inside or outside the processor, and may exchange data with the processor through a variety of known means.

It is evident to those skilled in the art that the present disclosure may be materialized in other specific forms without departing from the essential characteristics of the present disclosure. Accordingly, the detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure. Further, although the disclosure has described both product inventions and process inventions, description of both inventions may be complementarily applied as needed.

INDUSTRIAL APPLICABILITY

The preferred embodiments of the present disclosure described above are disclosed for an exemplary purpose, and modifications, changes, substitutions, or additions of various other embodiments may be hereinafter made by those skilled in the art within the technical spirit and the technical scope of the present disclosure disclosed in the appended claims.

The invention claimed is:

1. A method for receiving audio data using Bluetooth Low Energy technology, the method performed by a client device comprising:
    receiving, from a server device, a first advertisement message including information for providing an audio streaming service;
    receiving, from the server device, a second advertisement message including synchronization information for synchronization between the client device and the server device;
    receiving, from the server device, a third advertisement message including an indicator representing that audio data of the audio streaming service is grouped with audio data information for the audio data and transmitted;
    receiving, from the server device, broadcast audio data including the grouped audio data and the audio data information based on the indicator, through an isochronous channel;
    obtaining, from an user, specific information related to whether to permit a provision of the audio streaming service based on the audio data information; and
    decoding the audio data based on the specific information representing permission to provide the audio data.

2. The method of claim 1, further comprising:
    decoding the audio data information,
    wherein only the audio data information among the audio data and the audio data information is decoded before the specific information is obtained from the user.

3. The method of claim 1, further comprising:
    outputting the decoded audio data information.

4. The method of claim 1,
    wherein the synchronization information includes timing information of the broadcast audio data and frequency hopping information for reception of the audio data.

5. The method of claim 1,
    wherein a grouping identifier (ID) for identifying the broadcast audio data is assigned to the broadcast audio data,
    wherein an audio data ID for identifying the audio data is assigned to the audio data, and
    wherein an audio data ID for identifying the audio data information is assigned to the audio data information.

6. The method of claim 5,
    wherein the audio data and the audio data information are interleaved and grouped.

7. The method of claim 1, further comprising:
    establishing a connection with the server device;
    transmitting, to the server device, a read request message requesting to read state information of the audio data information stored in a first specific characteristic of the server device,
    wherein the state information includes at least one of name information of the audio data, date information at which the audio data is stored in the first specific characteristic, or version information of the audio data; and
    receiving, from the server device, a read response message including the status information.

8. The method of claim 7,
    transmitting, to the server device, a write request message for requesting to write characteristic value related to changed audio data information to a second specific characteristic of the service device, in order to change the audio data information, based on based on the state information,
    wherein the write request message includes a part of data consisting of the changed audio data information; and
    receiving, from the server device, a write response message in response to the write request message.

9. The method of claim 8,
    wherein each of the write request messages includes sequence number information for the part of the data.

10. The method of claim 1, further comprising:
    receiving, from a management server that manages a plurality of server devices including the server device, an entire synchronization information related to synchronization between the plurality of server devices and the client device,
    wherein the entire synchronization information includes synchronization information for each of the plurality of server devices.

11. The method of claim 10,
    wherein the synchronization information for each of the plurality of server devices is previously stored in the management server.

12. The method of claim 1,
    wherein the audio data is audio data related to a specific program provided by the server device, and
    wherein the audio data information indicates a title of the specific program.

13. The method of claim 1, further comprising:
    measuring a received signal strength of the first advertisement message,
    wherein based on the received signal strength of the first advertisement message being greater than or equal to a specific threshold value, the first advertisement message is decoded.

14. A client device for receiving audio data using Bluetooth Low Energy technology, the client device comprising:
- a transmitter for transmitting a radio signal;
- a receiver for receiving a radio signal; and
- a processor operatively coupled to the transmitter and the receiver,
- wherein the processor is configured to control:
- the receiver to receive, from a server device, a first advertisement message including information for providing an audio streaming service;
- the receiver to receive, from the server device, a second advertisement message including synchronization information for synchronization between the client device and the server device;
- the receiver to receive, from the server device, a third advertisement message including an indicator representing that audio data of the audio streaming service is grouped with audio data information for the audio data and transmitted;
- the receiver to receive, from the server device, broadcast audio data including the grouped audio data and the audio data information based on the indicator, through an isochronous channel;
- to obtain, from an user, specific information related to whether to permit a provision of the audio streaming service based on the audio data information; and
- to decode the audio data based on the specific information representing permission to provide the audio data.

15. The client device of claim 14,
wherein the processor is further configured to control:
to decode the audio data information,
wherein only the audio data information among the audio data and the audio data information is decoded before the specific information is obtained from the user.

* * * * *